United States Patent
Myers, III et al.

(10) Patent No.: US 10,841,120 B2
(45) Date of Patent: Nov. 17, 2020

(54) APPLICATION DEVELOPMENT FRAMEWORK FOR DEVICE CONTROL APPLICATIONS OF IOT DEVICES

(71) Applicant: Ayla Networks, Inc., Santa Clara, CA (US)

(72) Inventors: Daniel J. Myers, III, Fremont, CA (US); Brian King, Sunnyvale, CA (US); Emanuel Peña Aguilar, Morelia (MX)

(73) Assignee: Ayla Networks, Inc., Milpitas, CA (US)

( * ) Notice: Subject to any disclaimer, the term of this patent is extended or adjusted under 35 U.S.C. 154(b) by 0 days.

(21) Appl. No.: 16/011,147

(22) Filed: Jun. 18, 2018

(65) Prior Publication Data

US 2019/0310832 A1 Oct. 10, 2019

Related U.S. Application Data

(60) Provisional application No. 62/654,986, filed on Apr. 9, 2018.

(51) Int. Cl.
*H04L 12/28* (2006.01)
*G06F 8/35* (2018.01)
*G06F 8/41* (2018.01)
*H04L 29/08* (2006.01)

(52) U.S. Cl.
CPC ............ *H04L 12/2814* (2013.01); *G06F 8/35* (2013.01); *G06F 8/423* (2013.01); *G06F 8/427* (2013.01); *G06F 8/443* (2013.01); *H04L 12/281* (2013.01); *H04L 12/2809* (2013.01); *H04L 12/2816* (2013.01); *H04L 12/2823* (2013.01); *H04L 67/125* (2013.01)

(58) Field of Classification Search
CPC . G06F 8/35; G06F 8/423; G06F 8/427; G06F 8/443; H04L 67/125
See application file for complete search history.

(56) References Cited

U.S. PATENT DOCUMENTS

| | | | |
|---|---|---|---|
| 6,487,713 B1 * | 11/2002 | Cohen | G06F 8/34 717/105 |
| 6,546,551 B1 * | 4/2003 | Sweeney | G06F 8/433 717/148 |
| 8,099,480 B1 | 1/2012 | Muthusrinivasan et al. | |
| 9,383,976 B1 * | 7/2016 | Singh | G06F 8/34 |

(Continued)

*Primary Examiner* — S. Sough
*Assistant Examiner* — Stephen D Berman
(74) *Attorney, Agent, or Firm* — Lowenstein Sandler LLP

(57) ABSTRACT

In embodiments, a processing device receives an identification of a source code file for a device control application and an associated configuration file for the device control application. The processing device parses the configuration file to identify a first set of classes that are specified in the configuration file but that are not specified in the source code file. The processing device analyzes the source code file to identify a second set of classes that are specified in the source code file. The processing device retrieves the first set of classes and the second set of classes from a library, wherein classes from the library other than the first set of classes and the second set of classes are not retrieved. The processing device generates an executable file for the device control application based on the source code file, the first set of classes and the second set of classes.

20 Claims, 24 Drawing Sheets

(56) References Cited

U.S. PATENT DOCUMENTS

| | | | |
|---|---|---|---|
| 10,114,624 B1* | 10/2018 | Makkar | G06F 8/72 |
| 2003/0135565 A1 | 7/2003 | Estrada | |
| 2004/0172637 A1 | 9/2004 | Koutyrine | |
| 2007/0150749 A1* | 6/2007 | Monaghan | G06F 8/34 |
| | | | 713/189 |
| 2008/0195997 A1* | 8/2008 | Herberger | G06F 8/34 |
| | | | 717/100 |
| 2009/0133014 A1 | 5/2009 | Laurila et al. | |
| 2010/0161506 A1 | 6/2010 | Bosenick et al. | |
| 2012/0079409 A1* | 3/2012 | Luo | G06F 8/34 |
| | | | 715/772 |
| 2012/0246122 A1 | 9/2012 | Short et al. | |
| 2012/0315881 A1 | 12/2012 | Woloshyn | |
| 2013/0061214 A1 | 3/2013 | Jagatheesan et al. | |
| 2013/0073994 A1 | 3/2013 | Liao et al. | |
| 2013/0238498 A1* | 9/2013 | Forsyth | G06Q 20/18 |
| | | | 705/43 |
| 2014/0106733 A1 | 4/2014 | Wei | |
| 2014/0188911 A1 | 7/2014 | Skeen et al. | |
| 2015/0074634 A1* | 3/2015 | Lee | G06F 8/34 |
| | | | 717/104 |
| 2015/0097682 A1 | 4/2015 | Rossi et al. | |
| 2015/0120767 A1 | 4/2015 | Skeen et al. | |
| 2015/0286495 A1* | 10/2015 | Lee | G06F 16/164 |
| | | | 718/102 |
| 2016/0283200 A1* | 9/2016 | Standley | G06F 8/34 |
| 2016/0283256 A1* | 9/2016 | Standley | G06F 1/24 |
| 2017/0168854 A1* | 6/2017 | Rao | G06F 8/315 |
| 2018/0181378 A1* | 6/2018 | Bakman | G06F 8/38 |

* cited by examiner

```
public class MainActivity extends SepiaActivity {
    private static final String LOG_TAG = "MainActivity";

@Override
    protected void onCreate(Bundle savedInstanceState) {
        super.onCreate(savedInstanceState);
        // Load the configuration
        SepiaConfig config;
        try {
            SepiaConfig config = loadConfiguration(R.raw.my_sepia_config);
        } catch (RuntimeException e) {
            Toast.makeText(this, e.getMessage(), Toast.LENGTH_LONG).show();
            return;
        }

// Validate the configuration. This check may be removed once the configuration has become
        // stable.
        String errors = config.validate(this);
        if (errors == null) {
            // No errors in the config. Let's get started!
            startApplication();
        } else {
            AylaLog.d(LOG_TAG, "Config failed: \n" + errors);
            Toast.makeText(this, errors, Toast.LENGTH_LONG).show();
        }
    }

@Override
    public boolean handleDrawerMenuItem(String menuItemName) {
        // Drawer menu items that do not have an associated screen will call back here when selected
        if (super.handleDrawerMenuItem(menuItemName)) {
            return true;
        }
        AylaLog.d(LOG_TAG, "Unhandled drawer menu item: " + menuItemName);
        return false;
    }
}
```

FIG. 2A

```
{"class": "AylaDevice", // or your own custom class
 "detailScreen": "amap_thermostat", // or your own custom class
 "icon": "ic_ayla_evb",
 "managedProperties": [
   {
    "control": "decimal_input", // Control for input / display
    "name": "temp_setpoint", // Property name
    "notify": false, // Do not enable notifications
    "schedule": true // Enable schedules
   },
   {"name": "current_temp", // Property name
    "control": "readonly_text", // Control for display
    "notify": true, // Enable notifications
    "schedule": false // Do not enable schedules
   },
   {"name": "on_off", // Property name
    "notify": false, // Do not enable notifications
    "schedule": true // Enable schedules
    "actions": [
      {
       "name": "turn_off",
       "value": 0
      },
      {"name": "turn_on",
       "value": 1}],
   },
   "name": "My Thermostat", // Device name
   "oemModel": "tstat-1", // OEM model
   "scheduleScreen": "schedule" // Screen to show for scheduling
  },
```

FIG. 2B

```
  {
   "name": "t_fan_speed",
   "roles": ["fanControl"],
   "notify": true,
   "actions": [
     {
      "name": "fan_off",
      "icon": "fan_off_icon",
      "value": 0
     },
     {
      "name": "fan_silent",
      "icon": "fan_silent",
      "value": 1
     },
     {
      "name": "fan_low",
      "icon": "fan_low",
      "value": 2
     },
     {
      "name": "fan_medium",
      "icon": "fan_medium",
      "value": 3
     },
     {
      "name": "fan_high",
      "icon": "fan_high",
      "value": 4
     }]
  },
```

FIG. 2C

```
{
"class": "AllDevicesScreen",
"name": "device_list",
"icon": "ic_device_list",
"title": "device_list",
"extras": {
"addDeviceScreen": "setup_wizard",
"includeGateways": true
}
},
```

```
"menus": [
{"name": "drawer_menu",
"items": [
"device_list",
"setup_wizard",
"sign_out",
"edit_account",
"select_config"
]
},
{
"name": "ac_details_menu",
"items": ["device_details"]
}
],
"homeScreen": "device_list",
"signInScreen": "sign_in",
"drawerMenu": "drawer_menu"
}
```

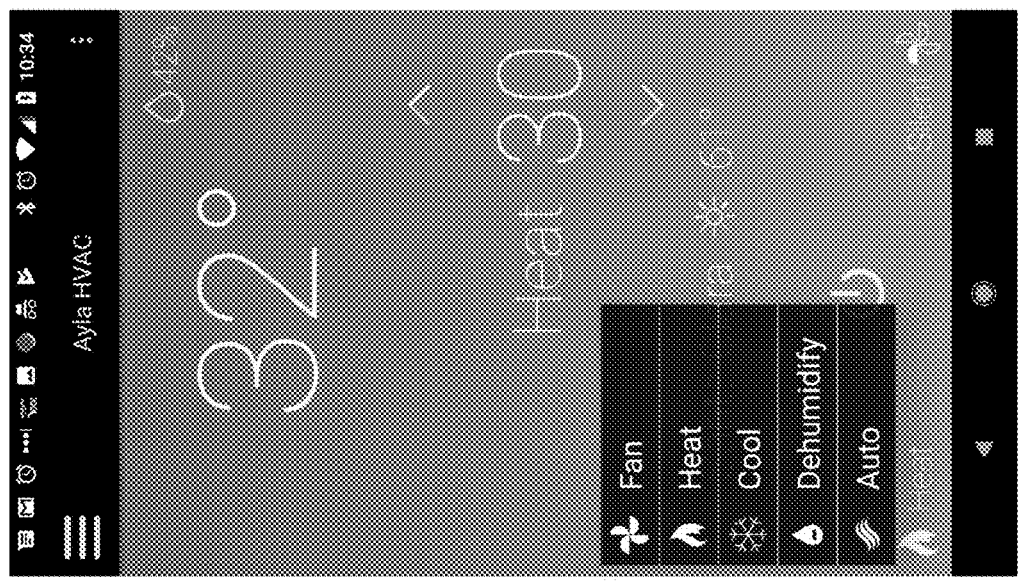

```
{"name": "ac_mode_picker",
"class": "ActionPicker",
"extras": {
"property": "t_work_mode",
"textColor": "#ffffff",
"backgroundColor": "#00000000" },
```

FIG. 30A

```
"name": "t_work_mode",
"roles": ["modeControl"],
"notify": true,
"schedule": true,
"actions": [{
"name": "mode_fan",
"icon": "mode_fan",
"value": 0},
{"name": "mode_heat",
"icon": "mode_heat",
"value": 1},
{"name": "mode_cool",
"icon": "mode_cool",
"value": 2},
{"name": "mode_dehumidify",
"icon": "mode_dehumidify",
"value": 3},
{"name": "mode_auto",
"icon": "mode_auto",
"value": 4}]},
```

```
{"name": "t_fan_speed",
"roles": ["fanControl"],
"notify": true,
"schedule": true,
"actions": [
  {
  "name": "fan_auto",
  "icon": "fan_auto",
  "value": 0
  },
  {
  "name": "fan_silent",
  "icon": "fan_silent",
  "value": 1
  },
  {
  "name": "fan_low",
  "icon": "fan_low",
  "value": 2
  },
  {
  "name": "fan_medium",
  "icon": "fan_medium",
  "value": 3
  },
  {
  "name": "fan_high",
  "icon": "fan_high",
  "value": 4
  }]},
```

3200

```
"controls": [
    {
        "name": "ac_device_control",
        "class": "ACDeviceControl",
        "extras": {
            "bgHeat": "heatColor",
            "bgCool": "coolColor",
            "bgDehumidify": "dehumidifyColor",
            "bgOff": "offColor"
        }
    },
    {
        "name": "ac_alt_device_control",
        "class": "ACDeviceControl",
        "extras": {
            "bgHeat": "altHeatColor",
            "bgCool": "altCoolColor",
            "bgDehumidify": "altDehumidifyColor",
            "bgOff": "altOffColor"
        }
    },
```

FIG. 35

```
{
    "name": "led_light_green",
    "class": "AylaLEDControl",
    "extras": {
        "ledColor": "green"
    }
},
{
    "name": "led_light_blue",
    "class": "AylaLEDControl",
    "extras": {
        "ledColor": "#0000aa"
    }
},
```

FIG. 36A

```
{
    "class": "AylaEVBDevice",
    "name": "Ayla EVB",
    "detailScreen": "auto_device",
    "icon": "ic_ayla_evb",
    "oemModel": "ledevb",
    "scheduleScreen": "schedule",
    "ssidRegex": "Ayla-[0-9a-zA-Z]{12}",
    "managedProperties": [
        {
            "control": "led_light_blue",
            "name": "Blue_LED",
            "notify": true,
            "schedule": true
        },
        {
            "control": "led_light_green",
            "name": "Green_LED",
            "notify": true,
            "schedule": true
        },
        {
            "control": "blue_button",
            "name": "Blue_button",
            "notify": true,
            "schedule": false
        },
        {
            "control": "generic_number_control",
            "name": "decimal_out",
            "notify": "true",
            "schedule": "false"
        },
        {
            "control": "generic_number_control",
            "name": "decimal_in",
            "notify": "true",
            "schedule": "true"
        }
    ]
}
```

FIG. 36B

APPLICATION DEVELOPMENT FRAMEWORK FOR DEVICE CONTROL APPLICATIONS OF IOT DEVICES

RELATED APPLICATIONS

This patent application claims the benefit under 35 U.S.C. § 119(e) of U.S. Provisional Application No. 62/654,986, filed Apr. 9, 2018, which is incorporated by reference herein. This patent application is related to co-pending U.S. application Ser. No. 16/011,151, filed Jun. 18, 2018.

BACKGROUND

Many modern appliances, consumer devices, and other devices include embedded systems that are configured to perform one or more dedicated functions. Such devices may be network-connected devices referred to as internet-of-things (IoT) devices and/or remotely accessible devices. Customers of IoT devices expect to be able to control such devices from their mobile computing devices, such as their tablet computers and mobile phones. However, writing programs to interface with and control the IoT devices can be a time consuming and challenging process.

BRIEF DESCRIPTION OF THE DRAWINGS

Reference will now be made to the accompanying drawings showing example embodiments of the present disclosure, and in which:

FIG. 2A is an example skeleton source code file that can be used with the application development framework to create a device control application, in accordance with one embodiment;

FIG. 2B illustrates configuration information used to generate the a thermostat object for a device control application;

FIG. 2C illustrates example configuration information for the fan control actions in a configuration file;

FIG. 29 illustrates an example action picker control of a device control application;

FIGS. 30A-B illustrate configuration information used to generate the action picker control of FIG. 29;

FIG. 35 illustrates sample configuration information used for two controls;

FIG. 36A illustrates example configuration information for two device properties;

FIG. 36B illustrates example configuration information in a managed properties section of a device.

DETAILED DESCRIPTION

Figure 1:
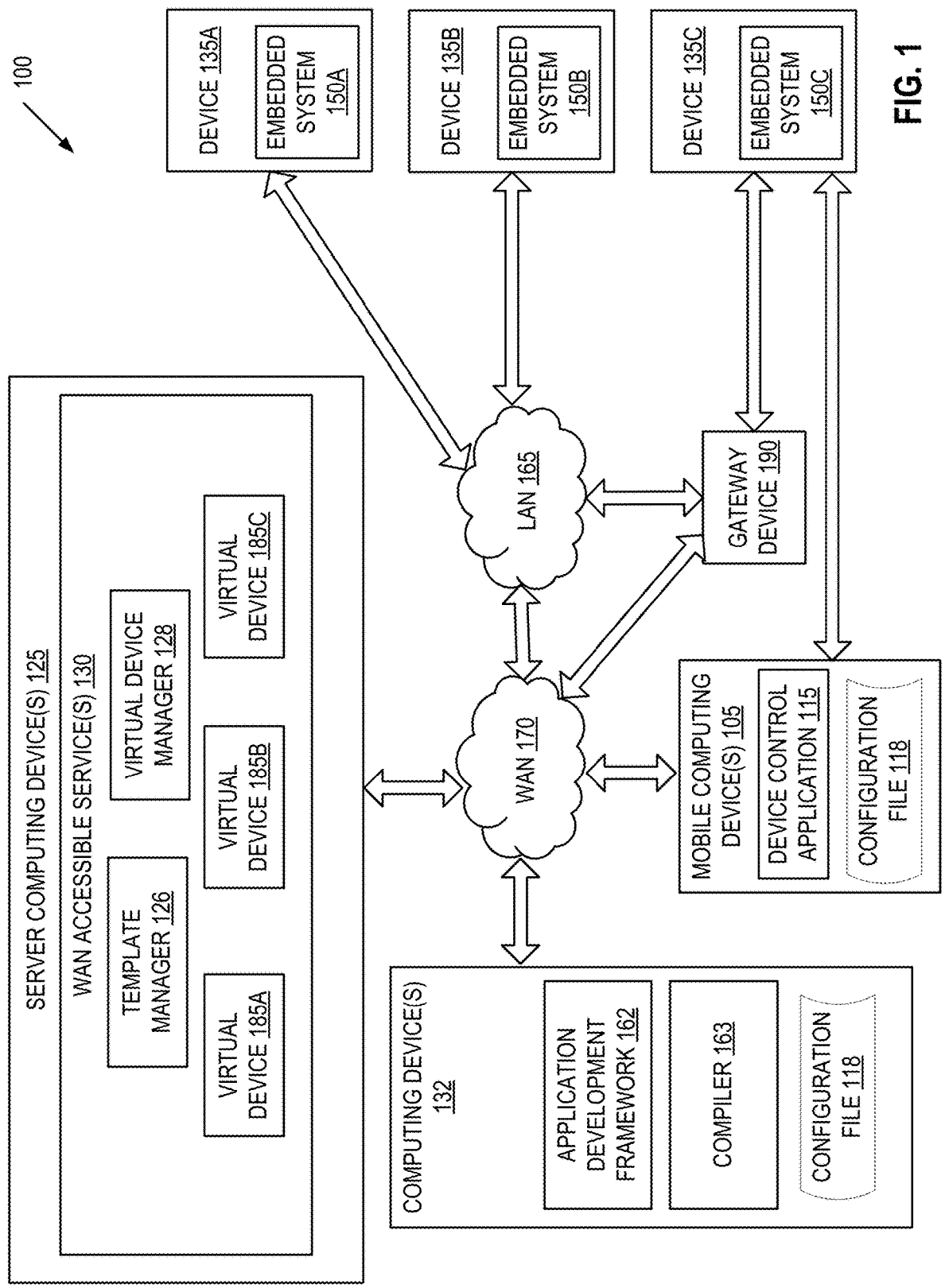
FIG. 1 is a block diagram depicting an example network architecture including mobile computing devices that include device control applications for controlling remotely accessible devices via WAN accessible services, in accordance with embodiments of the present disclosure.

Embodiments are directed to an application development framework that can generate device control applications with minimal or no coding. The device control applications may be mobile applications that operate as remote controls for viewing and controlling remote network-connected devices (also referred to as Internet of Things (IoT) devices). The application development framework may be used as the foundation of many different device control applications, where each of the device control applications generated from the application development framework may include different graphics, include different screens, include different controls, include different actions, be used for controlling different devices, and/or have different workflows. A developer may create a new device control application by selecting one or more graphics, selecting one or more screens, selecting one or more controls, and selecting one or more actions. A configuration file may then be generated that specifies the selected graphics, screens, controls and actions as well as the relationships between these selected resources and classes. A device control application may be generated by compiling the application development framework using information collected from the configuration file.

The Internet of Things comprises three distinct areas: Cloud services, devices and mobile device control applications. While all three of these areas are critical to a successful IoT platform, the mobile application is the primary part of this infrastructure that is seen and interacted with by users. Regardless of the device or "thing" being controlled, the user's experience with the mobile application will be the strongest factor in determining the perceived quality of the product as a whole.

Writing quality IoT mobile applications (device control applications) is not an easy process. In addition to creating the user interface and logic for routine operations such as signing in, account management, password resets, etc., a device control application for an IoT device needs to handle device discovery and registration, device control, fast and reliable network communications (with both the cloud service and directly with devices themselves), schedules, offline usage, push notifications, and many more common IoT tasks. The application development framework described in embodiments herein provides the core functionality for these tasks, and also provides application-level code and/or user interface elements. The application development framework enables developers to develop device control applications quickly and with little or no coding. Such device control applications generated from the application development framework may include user registration features, user sign in and sign out features, device discovery features (e.g., using Wi-Fi, Bluetooth such as Bluetooth Low Energy, Zigbee, etc.), device registration features, device management features, device control features, device scheduling features, and/or device rule-making features. Since the application development framework includes accurate logic for controlling access to devices, network communications, device discovery, device registration, account management, password resets, scheduled actions, offline usage, push notifications, and so on, the developer does not need to write code for such logic. This may reduce an amount of time that it takes for a developer to write a new device control application while also minimizing errors and bugs in the device control application. Embodiments may also generate device control applications that are based on vetted code that may reduce memory leaks, reduce battery usage, reduce network usage, etc. in a mobile device executing the device control application (as compared to device control applications developed without the application development framework described herein).

In one embodiment, a processing device that includes an application development framework receives an identification of a source code file for device control application to be generated and an associated configuration file for the device control application. The configuration file may specify a first set of classes from a library that are not specified in the source code file, wherein the first set of classes comprises one or more screen classes for generating screen objects that represent navigation destinations for the device control application and one or more control classes for generating control objects that control at least one of a device or a device property of a device. The processing device parses the configuration file to identify the first set of classes that are specified in the configuration file but that are not specified in the source code file. The processing device analyzes the source code file to identify a second set of classes that are specified in the source code file. The processing device retrieves the first set of classes and the second set of classes from the library, wherein classes from the library other than the first set of classes and the second set of classes are not retrieved. The processing device then generates an executable file for the device control application based on the source code file, the first set of classes and the second set of classes.

In a further embodiment, a processing device (e.g., of a mobile computing device) executes an executable for a device control application (e.g., the executable generated using the application development framework). The device control application reads a first configuration file responsive to execution of the device control application. The device control application parses the first configuration file to identify one or more supported devices, managed properties of each of the one or more supported devices, actions that indicate information about the managed properties, screens, and controls associated with at least one of the one or more supported devices or the one or more managed properties. A control may cause a specified user input to generate a command to cause a managed property to have a specified value. The processing device performs runtime linking of the classes associated with supported devices, controls, screens, managed properties, actions, etc. to create a first version of the device control application from the first configuration file based on a result of the parsing. The processing device presents the first version of the device control application on the mobile device.

At a later time a second configuration file may be received and may replace the first configuration file. The processing device again executes the executable for the device control application. The device control application reads the second configuration file responsive to execution of the device control application. The device control application parses the second configuration file to identify one or more supported devices, managed properties of each of the one or more supported devices, actions that indicate information about the managed properties, screens and controls associated with at least one of the one or more supported devices or the one or more managed properties. The processing device creates a second version of the device control application from the second configuration file during runtime of the device control application based on a result of the parsing. The processing device presents the second version of the device control application on the mobile device. The first version of the device control application that is based on the first configuration file may be very different from the second version of the device control application that is based on the second configuration file. The two version of the device control application may include different controls, different screens, different workflows (e.g., for navigating between the screens), different graphics, different menus, and so on. However, the different versions of the device control application may be produced without recompiling the device control application.

In an example, a developer may define a switch device, and specify that the switch device has the role of a power device. This may inform the device control application that a device object may be used to turn the device on and off. The switch device may have a managed property defined in the configuration file that indicates "outlet 1", and may have two assigned actions for the managed property in the configuration file, where a first action is called "on" and a second action is called "off". From that information in the configuration file, the device control application can, at runtime, determine that the switch device includes the outlet 1 property, having the actions of on and off. Each action may be associated with particular values in the configuration file. Additionally, a button graphic may be associated with each of the actions. Accordingly, the device control application can display an on/off button representing "outlet 1", and user interaction of the button may cause a command to be send to the switch device to turn it on or off, and an appropriate graphic may then be displayed.

A developer may design a new device that has new unique properties, each of which has new unique values. The application development framework provides a means for mapping the new device, new properties and new values to existing controls so that the existing controls can be used to control the new device without any new code being written.

Referring now to the figures, FIG. 1 is a block diagram depicting an example network architecture 100 including mobile computing devices 105 that include device control applications 115 for controlling remotely accessible devices 135A-C via WAN accessible services 130, in accordance with embodiments of the present disclosure. The network architecture 100 includes the multiple devices 135A-C connected to a local area network (LAN) 165. Thus, the devices 135A-C may be referred to as network-connected devices, or alternatively as IoT devices.

In one embodiment, the devices 135A-C are devices with embedded systems 150A-C, and may include, for example, electrical appliances such as variable rotation speed fans, refrigerators, ovens, washers, driers, dishwashers, thermostats, alarms, air conditioners, televisions, radios, receivers, amplifiers, and so forth. The devices 135A-C may also include consumer devices such as digital watches, music players, game consoles, digital cameras, printers, and so forth. Other examples of devices 135A-C include stationary devices such as HVAC systems, traffic lights, factory controllers, signs, electronic billboards, sprinkler systems, and irrigation control systems, as well as medical devices. The embedded systems 150A-C may also be referred to as network-connected devices. Devices 135A-C may also be any other type of device that includes an embedded system. Alternatively, one or more devices 135A-C may not include an embedded system.

An embedded system 150A-C is a class of computing device that is embedded into another device as one component of the device. The device 135A-C typically also includes other hardware, electrical and/or mechanical components that may interface with the embedded system 150A-C. Embedded systems 150A-C are typically configured to handle a particular task or set of tasks, for which the embedded systems 150A-C may be optimized. Accordingly, the embedded systems 150A-C may have a minimal cost and size as compared to general computing devices.

The embedded systems 150A-C may each include a communication module (not shown) that enables the embedded system 150A-C (and thus the device 135A-C) to connect to LAN 165, to a wireless carrier network (e.g., that is implemented using various data processing equipment, communication towers, etc.), and/or directly to a mobile computing device 105 executing a device control application 115. The communication module may be configured to manage security, manage sessions, manage access control, manage communications with external devices, and so forth.

In one embodiment, the communication module is configured to communicate using Wi-Fi®. Alternatively, the communication module may be configured to communicate using Bluetooth®, Zigbee®, Internet Protocol version 6 over Low power Wireless Area Networks (6LowPAN), power line communication (PLC), Ethernet (e.g., 10 Megabyte (Mb), 100 Mb and/or 1 Gigabyte (Gb) Ethernet) or other communication protocols. If the communication module is configured to communicate with a wireless carrier network, then the communication module may communicate using Global Systems for Mobile Communications (GSM), Code-Division Multiple Access (CDMA), Universal Mobile Telecommunications Systems (UMTS), 3GPP Long Term Evaluation (LTE), Worldwide Interoperability for Microwave Access (WiMAX), or any other second generation wireless telephone technology (2G), third generation wireless telephone technology (3G), fourth generation wireless telephone technology (4G) or other wireless telephone technology.

The LAN 165 includes a router, switch, bridge or other network device (not shown) that enables communication between multiple devices connected to the LAN 165. The network device may provide wired connections to the LAN using, for example, Ethernet ports, universal serial bus (USB) ports and/or Firewire® ports. The network device may additionally provide wireless connections to the LAN using, for example, a Wi-Fi transceiver.

Some embedded systems 150A-C may not support any of the communication types supported by the network device. For example, device 135C may support Zigbee, and device 135B may support Bluetooth. To enable such devices to connect to the LAN 165, the LAN 165 may include a gateway device 190 connected to the network device via one of the connection types supported by the network device (e.g., via Ethernet or Wi-Fi). The gateway device 190 may additionally support other communication protocols such as Zigbee, PLC and/or Bluetooth, and may translate between supported communication protocols. Accordingly, some devices (e.g., device 135C) may connect to the LAN 165 and/or to the WAN 170 through the gateway device 190.

The LAN 165 (or wireless carrier) is connected to a wide area network (WAN) 170. The WAN 170 may be a private WAN (e.g., an intranet) or a public WAN such as the Internet, or may include a combination of a private and public network. The LAN 165 may include a router and/or modem (e.g., a cable modem, a direct serial link (DSL) modem, a Worldwide Interoperability for Microwave Access (WiMAX®) modem, a long term evolution (LTE®) modem, etc.) that provides a connection to the WAN 170.

The WAN 170 may include or connect to one or more server computing devices 125. The server computing devices 125 may include physical machines and/or virtual machines hosted by physical machines. The physical machines may be rackmount servers, desktop computers, or other computing devices. In one embodiment, the server computing devices 125 include virtual machines managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

Server computing device(s) 125 hosts one or more WAN accessible services 130, which may be a web based service and/or a cloud service (e.g., a web based service hosted in a cloud computing platform). A WAN accessible service 130 may maintain a session (e.g., via a continuous or intermittent connection) with one or more of the embedded systems 150A-C. Alternatively, the WAN accessible service 130 may periodically establish sessions with the embedded systems 150A-C. Sessions and connections may be between a virtual device 185A-C running on the server computing device 130 and the devices 135A-C.

Virtual device manager 128 may generate an instance of a virtual device 185A-C for each physical device 135A-C. The physical devices 135A-C may each have the same device type or may have different device types from the same or different manufacturers. For example, a separate virtual device 185A-C may be created for each unit of a particular product of an OEM. Each virtual device 185A-185C is generated from one or a set of device templates. The created virtual device 185A-C inherits device properties (e.g., logical and physical attributes) from each of the device templates used to create the virtual device. The virtual device 185A-C is then connected to a particular physical device 135A-C (e.g., to an embedded system 150A-C of a particular physical device 135A-C), and may be used to monitor, interface with, and control that physical device.

Via a session with an embedded system 150A-C (or device 135A-C), WAN accessible service 130 may use an appropriate virtual device 185A-C to issue commands to the embedded system (or device 135A-C) and/or receive status updates from the embedded system (or device 135A-C). Thus, the virtual device 185A-C may be used to control the device 135A-C. The commands may be commands to change a state of one or more parameters of a device controllable by the embedded system. For example, if the embedded system is embedded in a heater or thermostat, then the commands may include commands to increase or decrease a temperature. In another example, if the embedded system is embedded in a home automation system, then the commands may include commands to turn lights on or off. In another example, if the embedded system is embedded in a variable rotation speed fan, then the commands may include commands to increase or decrease the fan speed.

Status updates received from the embedded systems 150A-C may identify values or states of some or all detectable parameters of devices 135A-C that the embedded systems are included in. Status updates may also include fault information, statistical device usage information, trace data and/or other information. Such values, states and/or other information may change based on direct user interaction with the devices. Such values, states and/or other information may also change responsive to commands sent to the embedded systems 150A-C by the WAN accessible service 130 and/or by computing devices 105 via an appropriate virtual device 185A-C. Moreover, values, states and other information of the embedded systems 150A-C may change based on environmental conditions of the embedded systems. By maintaining or periodically establishing sessions with the embedded systems 150A-C, the WAN accessible services 130 may maintain up-to-date information on the devices 135A-C, and such up-to-date information may be reflected in a virtual device 185A-C.

Mobile computing devices 105 may include a device control application 115 that may generate commands for the embedded systems 150A-C and that may display the states of the devices 135A-C. Mobile computing devices 105 may include portable devices such as electronic book readers, portable digital assistants, mobile phones, laptop computers, portable media players, tablet computers, cameras, video cameras, netbooks, notebooks, and the like. Alternatively, traditionally stationary computing devices such as desktop computers, gaming consoles, digital video disc (DVD) players, media centers, and the like may be used instead of mobile computing devices. The traditionally stationary computing devices may also include an installed device control application 115. Mobile computing devices 105 and/or stationary computing devices may also include devices capable of receiving voice commands such as intelligent assistant devices that may interface with home networks. In some implementations, computing devices may include smart home assistant devices such as Amazon Echo®, Google Home®, Apple HomePod®, or the like.

As shown, mobile computing devices 105 include a device control application (or multiple device control applications) 115. The device control application 115 may be a remote control application for remotely controlling one or more of devices 135A-C. The device control application 115 may be programmed to run on various operating systems, such as Windows® operating systems, Unix® operating systems, iOS® operating systems, Android® operating systems and Java® operating systems to name a few. The device control application 115 may include a graphical user interface (GUI) that enables users to interact with and control devices 135A-C in an intuitive and user-friendly manner. A user may interact with the GUI to cause the remote control application 115 to obtain the state of, and send commands to, the devices 135A-C represented in the GUI.

On each execution of the device control application 115, the device control application may access a configuration file 118. The configuration file 118 is used at run-time to initialize a mobile SDK and provide the device control application 115 with the details of how the application should be presented, what menus are displayed, etc. This may include parsing the configuration file 118 to identify used classes and/or resources, performing runtime linking for the used classes, and so on. The look, feel and/or functionality of the device control application 115 may be completely changed at any time based on modifying or replacing the configuration file 118. Such changes to the device control application 115 may be made without recompiling the device control application 115. The configuration file 118 itself is not executable code, but rather a data structure read by the application development framework (a portion of which is include in the device control application 115) on application startup to initialize the framework. This enables a developer to easily enable and disable features of the device control application 115, change a flow of the device control application, modify controls of the device control application, modify actions of the device control application, correct errors in the device control application, etc. through adding, removing and editing text in the configuration file. For example, features may be disabled and enabled by adding or removing user interface (UI) hooks into these features in the configuration file 118.

The application flow for the device control application may be fully controlled by the configuration file 118. The application flow may refer to how the application navigates from screen to screen as well as what controls and options are available in each screen. The application flow may include application startup, a sign in check, a configured home screen, and a configured navigation. Application flow is described in greater detail with reference to FIG. 2.

The device control application 115 may be developed on one or more computing devices 132, which may be mobile computing devices and/or stationary computing devices as detailed above. The computing device 132 may include an application development framework 162 as well as a compiler 163. The application development framework 162 may be a source code library for the device control application 115 that includes more resources and/or classes than will be used in the device control application 115. The application development framework may include a library of resources and a library of classes. The resources may include, for example, different graphics elements for use in displaying a GUI for the device control application 115. The classes may include multiple different types of classes, all of which provide some relevant functionality associated with viewing and/or controlling devices 135A-C.

Below is a list of some supported features of the application development framework 162. Any of these features may be included in device control application 115 generated from application development framework 162, depending on the configuration file 118 used to generate the device control application 115. Depending on the nature of the device 135A-C and device control application 115, some or all of these components may be included in the device control application 115. Whether components are included in the device control application 115, and how and where they are presented in the application flow, are determined by the configuration file 118.

| | |
|---|---|
| User sign-up | UI for entering account information; Callback into application to verify (from email link) |
| Forgot password link | Send request to cloud; Callback into application to verify (from email link) |
| User sign-in | Username/password; Google Sign-In; Facebook Sign-In; Baidu Sign-In (China); OAuth skeleton (requires OAuth details to be provided) |
| Wi-Fi Setup | Setup process for devices that join a Wi-Fi network |
| Device registration | Associate devices with the user account |
| Device List Display | Show registered devices in various formats (lists, swiped screens, etc.) |
| Device Details display | Show details about a registered device (DSN, IP address, name, model, etc.) |
| Device Control | Controls for common IoT device properties: Temperature/Thermostat; On/Off switches; Color pickers; Dimmable light controllers; etc. |
| Device unregistration | Remove a device from the user's account |
| Device sharing | Share a device with another user account with read/write or read-only access |
| Contact management | Manage an address book of contacts for sharing or notifications |
| Device notifications | Set up notifications when certain criteria are met. Can notify via email, SMS or push notifications |
| Location-based Automations | Control devices based on your location. Supports geofences (GPS location/radius) as well as BLE Beacons (iBeacon, Eddystone) |
| Fingerprint authentication | Fingerprint-based authentication on supported devices in lieu of username/password |

Device control applications 115 (e.g., mobile IoT applications) vary widely in complexity. A simple application to control a wall outlet might be quite different from a complex application used to control all aspects of home automation from door sensors to colored lighting. As each application has a different set of requirements, the application development framework 162 enables developers to define which components to include as well as how they should be presented in a single configuration file 118. The same configuration file 118 may be used for versions of the device control application 115 developed for different operating systems (e.g., the same configuration file 118 may be shared between iOS and Android).

To create a new device control application 115, a developer may create a simple skeleton application. The skeleton application's main class may derive from a base class of the application development framework 162, which allows the application development framework 162 library a great deal of control over application flow while still providing a means for the developer to override any behavior through sub-classed methods. An example main class, called "MainActivity", which may contain an entirety of the code needed to support the device control application 115, is provided in FIG. 2A.

As shown, the "MainActivity" is a subclass of the base class, called "SepiaActivity". The "onCreate" method is overridden and handles choosing the correct configuration file to load. The "loadConfiguration( )" method returns an array of string values, one for each error encountered in the configuration file 118. If no errors were found, the method returns null. If any portion of the configuration file 118 is invalid, an exception will be thrown instead. The application flow begins with the call to "startApplication( )".

The base class of the application development framework 162 (e.g., "SepiaActivity"/"SepiaAppDelegate" classes provide the heart of the application development framework. All device control applications should have a main class derive from the base class (e.g., from SepiaActivity for Android or SepiaAppDelegate for iOS). Structuring the application this way allows the application development framework 162 to drive the application flow while still allowing complete control and customization to the application developer. While the application development framework 162 provides functionality useful to all applications, many applications will require additional screens, controls or logic in order to meet the specific needs of the developer. Because the developer will be working with the designated base class, any of the frameworks' methods may be overridden and customized. This means if the application development framework 162 does not quite meet the needs of the application, the framework's behavior can be changed at the application level very easily.

The base class contains a number of helpful methods that can be called to help with obtaining information from the configuration file 118, create, push or pop screens from the navigation stack, navigate to screens by name, etc. Additionally, derived classes may override methods to receive events for menu taps or navigation drawer taps as well as override any of the default behavior of the framework.

Many resources and/or classes to be used by the device control application 115 may not be specified in the source code file for the device control application. Instead, such resources and/or classes may be specified in the configuration file 118. This configuration driven framework can interfere with the linking process performed during compiling of the device control application. For example, since classes and resources are not specified in the source code file, a linker does not know what classes to include in the compiled executable and which classes to exclude from the compiled executable. If all classes and resources were included in the executable, then the device control application would be unnecessarily large. Accordingly, an optimizer is used to identify classes and resources to exclude from the executable file.

However, optimizers generally optimize based solely on the source code file. Thus, an optimizer will also not know when classes and resources to include and which to exclude. This would cause the optimizer to exclude classes that will be used by the device control application during runtime since those classes are not identified in the source code file. Similarly, the optimizer would include all resources, including resources that will not be used by the device control application 115.

Accordingly, a compiler 163 or other component parses the configuration file 118 prior to linking, and identifies all classes and resources specified in the configuration file 118. The compiler 163 may then generate a list of resources to include and a list of classes to include in the device control application 115. The identified classes and resources are then included in the device control application 115 at compile time, and other classes and resources that are neither identified in the source code file nor the configuration file 118 are excluded from the device control application 115. The lists may be, for example, files (e.g., Proguard files) that will be used by an optimizer such as Proguard at compile time to determine which classes and resources to keep. Thus, linking is being driven by the configuration file 118 in addition to or instead of the source code files.

This provides flexibility with regards to changes that can be made to the device control application after it is compiled. For example, if some values used by a device are initially input into the configuration file 118 incorrectly (e.g., a device uses a value of 7 to turn a fan off but a value of 9 was include in the configuration file), then the configuration file 118 can be edited after the device control application has been compiled by changing the incorrect value (e.g., by changing the value of 7 to a value of 9 in the configuration file). If the device control application had already been released to end users, the correction to the device control application 115 could be implemented simply by pushing an update to the configuration file 118, without actually changing the device control application executable.

Application development framework 162 uses the configuration file 118 to determine what resources from the application development framework libraries to include in device control application 115 and what resources to exclude from the device control application 115. Application development framework 162 additionally uses the configuration file 118 to determine what classes from the application development framework libraries to include in the device control application and what classes to exclude from the device control application 115. The device control application 115 then later uses the configuration file 118 each time the device control application 115 is launched to determine what the device control application 115 will look like, to control flows between screens of the device control application, and so on.

The configuration file 118 defines the application configuration parameters, such as application ID, application secret, and supported device models. Additionally, the configuration file 118 describes the overall application flow from the sign-in screen to the main screen to menus and other navigation tools. With the exact same code (e.g., Swift or Java code), different configuration files 118 will yield vastly different applications. The same code base with different configuration files 118 can produce a simple application for controlling a single light, or a complex menu-driven application used to control a whole-home IoT solution. Device control applications 115 may be created using supplied screens and controls, and developers can entirely customize the look, feel and flow of the device control application 115 solely by changing the configuration file 118. Additional screens and controls may also be created and referenced within the configuration file 118, allowing full customization of the device control application 115 while retaining the simplicity of configuration-driven development.

In one embodiment, the configuration file 118 is a Javascript Object Notation (JSON) document containing information specific to the device control application 115 being designed. The configuration file 118 may include references to resources as well as references to classes.

Resources may include, for example, strings and images. Resources referenced in the configuration file 118 are either used as keys in a string lookup table (in the case of string resources) or filenames without extensions in the case of image resources. For example, a device might be defined in the configuration with the "name" field set to "outlet_name", and the "icon" field set to "outlet_icon". The string table in each device control application 115 would contain the display name for that device ("Smart Outlet", perhaps) in the string table with the key "outlet_name". Each device control application 115 also would include an image resource named "outlet_icon.png" or "outlet_icon.jpg" or any other supported image format. This allows application development framework 162 to properly show the correct name and an appropriate image/icon for each device.

The configuration file 118 is broken up into several sections in embodiments. The configuration file 118 may include a root section containing general application parameters, a the software development kit (SDK) section containing SDK-specific initialization parameters, a devices section specifying details about devices supported by the device control application 115, and a user interface section describing the various screens, controls and application flow.

The root section or element of the configuration file 118 contains information about the configuration and application itself. The root section of configuration file 118 may contain a version field, a name field, an application identifier field, a packages (or bundles) field, a devices field, an SDK configuration field, and/or a user experience field. The version field indicates a version of the configuration file 118. This may be used by the device control application 115 to ensure the version of the configuration file 118 matches an expected version. The name field provides a name of the configuration file 118. This field provides a way for the application to identify the configuration file 118 it was built with. The application identifier (ID) field identifies the application, and may be used as the application ID on Android and/or the bundle identifier on iOS. A value of the application ID field may be a unique string, which may be used for the application ID in Android or the bundle ID in iOS.

The packages field is an array of package names (e.g., Java package names) or bundle names used by classes within the configuration file 118. These packages may be pre-pended to class names to find them within the device control application 115. The devices field includes an array of device objects with details about the types of devices the device control application 115 supports. The device objects are used to describe the features and details of devices 135A-C controlled by the device control application 115. Device objects are described in greater detail below. The SDK configuration field includes configuration parameters used to initialize a mobile SDK associated with or included in the application development framework 162. The user experience field includes configuration parameters used to construct the user interface for the device control application 115. This includes screen definitions, controls, colors, menus, etc. The elements identified in the user experience field are described in greater detail below.

The SDK configuration section of the configuration file 118 contains information used by a mobile SDK of the device control application 115 for operation. This includes the application ID and application secret provided to a developer of the device control application 115 by an operator of the WAN accessible services 130, as well as information regarding the service type/location the device control application 115 should connect to. The SDK configuration section in the configuration file 118 may contain an application ID field, an application secret field, an allow mobile device subscription service (DSS) field, an allow offline use field, a service type field, a service location field, a console log level field, a file log level field, a platform ID field, and/or a default network timeout field. The application ID field and application secret may be assigned by a service provider for the WAN accessible services 130. These values should be supplied to the application development framework 162 in the configuration file 118 in the SDK configuration section. An example SDK configuration is set forth below.

```
"sdkConfig": {
    "appId": "AnApp_ID",
    "appSecret": "AnApp_Secret",
    "allowMobileDSS": false,
    "allowOfflineUse": true,
    "serviceType": "Development",
    "serviceLocation": "USA",
    "consoleLogLevel": "Debug",
    "fileLogLevel": "Debug",
    "xPlatformID": "12345",
    "defaultNetworkTimeoutMs": 5000
}
```

The application secret may be a key used by device control application 115 to access WAN accessible services 130. The allow mobile DSS field may have a value of true or false. If the value is true, then mobile DSS may be allowed. This will enable the mobile SDK to use the mobile DSS to keep the device status of devices 135A-C up to date (e.g., using websockets). If the mobile DSS field is set to false, the mobile SDK will instead poll the mobile DSS periodically to maintain information on statuses of the devices 135A-C.

The allow offline use field may have a value of true or false. If the value is true, then a user may be allowed to sign into the device control application 115 without a connection to WAN accessible services 130 (e.g., without an Internet connection). The service type field may have values of dynamic, field, development, staging or demo, depending on the intended use of the device control application 115. The service location may indicate a country or region in which the device control application is to be used, such as USA, China, Europe, and so on. The designated region causes the device control application 115 to connect to a particular WAN accessible service 130 instance associated with the designated region.

The console log level and file log level fields may indicate what data to include in logs, and may have a value of verbose, debug, info, warning, error, or none. The platform ID may be a unique string shared between device control applications to share data. This unique string may be used as a prefix for datum keys by the WAN accessible services 130 and device control applications 115. The default network timeout field may indicate a default timeout for network operations. In one embodiment, the default network timeout is 5000 ms.

Each manufacturer has different types of IoT devices that will be supported by the mobile application. While the functionality of each device 135A-C will vary, the application development framework 162 and device control application 115 can provide intelligent handling of devices by providing information to the device control application 115 through the device configuration settings.

Each type of device 135A-C is identified using a text field for OEM model. This field is used by the configuration file 118 to associate device types with screens and icons, as well as to provide details about the device properties. The "devices" section in the configuration file 118 is an array of objects, each representing a single device type. Each device object contains information that enables the device control application 115 to make intelligent decisions about how a specific type of device is displayed and interacted with. Each registered device may be represented as a base device class in the application code. Custom classes may be created to provide additional functionality to the base device class, though this is not always necessary.

To add support for a new device, a developer may create an entry in the devices section of the configuration file 118 for each device the device control application 115 is to support. A class field and an OEM model field are used in an embodiment. The class field indicates a subclass of the base device class that should be created for the device. If no custom class is used, the base class may be the class. The OEM model field is used to identify the device.

Additionally, the device entry may define which screen is launched to show details about a particular device via the detail screen field. Switches, for example, may be associated with a particular screen to control a switch, while a thermostat may be associated with a different screen to control temperature. To show a custom screen for a device when selected, the detail screen field may be set to the name of the screen to be shown for the particular type of device. Some screens show an icon for the device. To customize the image shown to represent a device, a developer may update the icon field with the name of the icon resource to display (e.g. "ic_generic_device").

In order for the device control application 115 to work, it needs to know as much as it can about the devices it will be controlling. The configuration file 118 contains a "devices" section that allows developers to provide detailed information about each device, which in turn allows the device control application 115 to control the device intelligently without requiring additional code written. The device section of the configuration file 118 may include an array of device objects (or array of device classes). The array of device objects may include a separate device object for each type of device supported by the device control application 115. Each device object may be derived from a device class. The device object may include a field indicating a device class associated with that device object. The device class indicates the name of the device class that should be created to represent a particular type of device in the device control application.

Each device class may define one or more properties for a device 135A-C. The properties may be physical attributes that are hard wired, hard coded or manufactured into the device 135A-C as well as logical attributes that may include business logic such as behaviors, notifications, rules, access control, derived properties, and so on for the device. Examples of physical attributes include sensors and sensor capabilities, input devices (e.g., buttons) and operations of the input devices, output devices (e.g., speakers, a display, etc.) and operations of the output devices, servos and servo settings, motors and motor settings, and so forth. Physical attributes may additionally include capabilities, behaviors, characteristics, etc. of firmware and/or software that is loaded into the devices 135A-C (e.g., into embedded systems 150A-C) in the devices.

Each device class may additionally define one or more logical or behavioral attributes for a device 135A-C. Logical attributes (also referred to as behavioral attributes) may include business logic such as behaviors, notifications, rules, access control, derived properties, and so forth that may not be programmed into a device. The logical attributes may instead be provided by a virtual device 185A-C on behalf of a physical device 135A-C. For example, a fan may have fan speed set points and controls for changing the fan speed set points. A virtual device established for the fan may include a rule stating that the fan speed may only be increased in increments of 10 percent. The virtual device may change the speed set point internally and may send a command to the physical device to change the set point to the selected speed on the physical device. In this example, the fan speed set point and the controls usable to set the fan speed set point would be considered physical attributes of the physical device, and the rule for controlling the set point would be considered a logical attribute assigned to the physical device.

A device object in the configuration file 118 may also include a particular manufacturer (OEM), a particular model number and/or a particular version number (e.g., a firmware version number). Thus, different device classes may be used based on manufacturer, device model and/or firmware version.

In the device section, each device object may include a class field, a detail screen field, a managed properties field, a model field, an original equipment manufacturer (OEM) field, a schedule screen field, an icon field, a device control field, and/or a service set identifier (SSID) regular expression (Regex) field. The class field indicates the name of a class that should be instantiated within the device control application 115 during execution. The class may derive from an Android base class or an iOS base class in embodiments. This allows user-defined device objects to be created and managed by the device control application 115. The detail screen field indicates the name of the screen to be presented by the device control application 115 if a user wishes to view details about a device associated with the device object. The managed properties field is an array of managed properties of a particular type of device. The model field has a value of a string that is used to identify devices of a particular type.

The OEM model field has a value of a string that is used to identify devices of a particular type based on an OEM designation. The schedule screen field indicates a screen shown for a particular type of device when the user wishes to set a schedule on the device. If this field is null or does not exist, schedules will not be made available for the associated device type. The icon field is a reference to an image resource to be shown to represent a particular device. The device control field is a reference to a control in the configuration file 118 that can be used to represent and/or control a device. For example, a thermostat device might use a device control that shows the current temperature, that shows a setpoint and that provides up/down controls to change the temperature setpoint. This control may be used to represent the thermostat device in a list of devices, for example. The SSID Regex field may have a value that is a regular expression used when searching for Wi-Fi access points from mobile computing device 105 and/or when searching for Wi-Fi access points from a device 135A-C. This allows the mobile computing device 105 and/or devices 135A-C to filter only for devices known to the system when scanning access points.

Devices 135A-C have "properties", which can be queried or modified to determine or change the state of a device 135A-C. A simple wall switch, for example, might have a single property called "on_off", which when set to 1 means the switch is on. An HVAC system on the other hand, might have many properties used to control the current setpoint, control fan speed, read the current temperature, etc. Application development framework 162 allows developers to describe the properties that will be managed by the device control application 115 in the configuration file 118. Each property may be named, assigned "actions" that can be performed by the user, or be assigned a "role" known to the application (for example, the "setpoint" property of a thermostat might be given the "tempSetpoint" role, which is used by the HVAC control screen to know which property is used to control the setpoint).

Properties that are not listed in this section may not automatically be kept up-to-date by the device control application 115. Before a property that is not managed is used, it should be first fetched from the service by calling a "fetchProperty( )" method on the device in an embodiment.

Each device object should provide a set of device property details that describe the various properties of the device that should be managed by the device control application 115 (e.g., by an SDK of the device control application 115), as well as additional hints to the device control application 115 that allow it to display an intelligent user interface to manipulate or display the property. Properties are used to control devices as well as gather information from them. The mobile SDK associated with the application development framework 162 is designed to manage sets of properties for devices, keeping them up to date and notifying the device control application 115 when changes occur. Each device in the configuration file 118 can specify the set of properties that the SDK should manage. These properties should contain properties that are important to the application and are expected to change regularly. While all properties may be included in this set, the fewer properties there are to manage, the more efficient the management will be.

In addition to specifying the properties, each property may include additional hints as to how it is intended to be used. For example, a thermostat might have a "set_temperature" value, a "current_temperature" value, and an "on/off" value. The "current_temperature" property would be a good candidate for notifications (email/sms/push notification when a certain temperature is reached), but does not make any sense to be something scheduled. The "set_temperature", on the other hand, would be a good candidate for a schedule, but does not make much sense for notifications. The "On/off" value might not want either, but it should be controllable as a toggle button in the UI. This particular device might be configured as shown in the example configuration file of FIG. 2B.

Each managed property of a device may have its own device property object in an embodiment. A device property object may include a control field, a name field, a notify field, a schedule field and/or an actions field. The control field may indicate that a particular control that should be used for this property to display or modify its value. If not provided, a generic control may be used based on the property's base type. The name field identifies the name of the property. The notify field may have a value of true or false. If set to true, the managed property can be used as a trigger for notifications. The schedule field may have a value of true or false. If set to true, the managed property can be scheduled such that a value or set point of the property can be changed at a future date and time in accordance with a schedule. The actions field may specify an array of actions available to the property. Each action object may map property values or ranges to textual descriptions and icons. Actions are described in greater detail below.

Actions are objects that provide even more detailed information about a managed property and what it means. They are the link between a property's value and what it means to the end user. An action is a mapping of "something to do" to a property value. For example, a simple wall switch might have a property that controls the on/off state of the switch. This property might use 0 to indicate "off" and 1 to indicate "on". An example actions array for this property might contain:

```
"actions": [
  {
    "name": "turn_off",
    "value": 0
  },
  {
    "name": "turn_on",
    "value": 1
  },
``` where the values "turn_off" and "turn_on" are entries in a localized string table of the device control application 115 that can be presented to the user as options on this device.

In another example, a fan control property might have several values representing speed. Each of these values would be represented in the configuration file 118 as an action, so when presented with a control to set the speed of the fan, the user would see the action names and icons rather than raw property values. A fan controller might have multiple settings for the same property, as set forth in the table below.

| Value | Text | Icon |
|---|---|---|
| 0 | "Off" | Fan off icon |
| 1 | "Silent" | Fan silent icon |
| 2 | "Low" | Fan low icon |
| 3 | "Medium" | Fan medium icon |
| 4 | "High" | Fan high icon |

As shown, the fan control property may have values of 0-4, with each value being associated with a different action (e.g., off, silent, low, medium and high) as well as a different icon. The mapping between objects from the configuration file as shown enables developers to create controls, associate them with properties, actions and icons, and they will perform potentially vastly different operations. The device control application obtains all of the information about the property from the configuration information, and it knows what to display as well as what value to set the property to when a user interacts with an associated control. Based on the configuration file, the device control application knows the name of a control, knows the property to control, knows the icon to show next to it, and knows what to do when the user selects it. This may be different for every device.

Example configuration information for the fan control actions in a configuration file 118 is shown in FIG. 2C. When configured to use a particular control object (e.g., an action picker ("ActionPicker") control object, the user will be presented with a menu composed of the fan speed names and their icons, allowing the application to set the appropriate property value based on the user selection.

When the device control application 115 presents a view to control a device, the actions of the managed properties of that device are queried to provide the user with a complete set of options to control the device.

The user experience section of the configuration file 118 drives the look and feel of the device control application 115, and defines the application flow, look and feel. Device control applications 115 use the user experience section to determine which screens to load, to determine whether a menu should be created, to determine how to populate the contents of a menu, to determine navigation, to define a color scheme to use, and/or to otherwise provide user interface tweaks that make each application unique. The user experience section is broken up into several sub-sections as set forth below in one embodiment. These sub-sections may include a default configuration section, a screens section, a controls section, a sign in screen and/or home screen section, a drawer menu section and/or a configuration section. On application startup, the device control application 115 (e.g., a platform engine portion of the device control application) first initializes the mobile SDK portion of the device control application 115 and then presents either the sign in screen (if the user has not yet logged in) or the home screen (if the user is signed in).

The default configuration sub-section specifies the default configuration for the user interface. All user interface (UI) elements will use the values specified in this section by default. Most visible components in the device control application 115 can be customized further if desired by overriding values found in the default configuration with values defined in the component's own configuration section, described in more detail below. The default configuration may include a window background color field, a title bar field, a disable drawer menu field and/or a font color field. The window background field may provide a color reference to a default background color of screens. The title bar field may have a value of true of false. If the value is true, a title bar may be shown. The disable drawer menu field may have a value of true or false. If the value is true, then the device control application 115 does not use a drawer menu. The font color field specifies a default font color.

The device control application 115 and application development framework 162 use the concepts of screens and controls. A screen is a full-sized application window presenting information to the user. It may contain controls within it. A control is not full-sized, and is contained within a screen or another UI element such as a view.

On Android, screens may be subclasses of "Fragments". On iOS, screens may be subclasses of "UIViewController". The screen class adds awareness of the configuration file 118 to the objects so that developers implementing screen objects may have full access to the fields specified in the configuration file 118.

The control class, like the screen class, adds the awareness of the configuration parameters to the objects. There are two basic types of controls used in device control application: property controls and device controls. Property controls are tied to a particular property of a device, and are used to display and possibly change the value of that particular property. An example of a property control is the light emitting diode (LED) control. The control is tied to a particular property (e.g. Blue_LED or Green_LED). It will display in a bright color if the property value is non-zero, and a dark color if the property value is zero. It will change the value from 1→0 or vice-versa if the control is tapped. Property controls are attached to their property via a call to the control's "attachProperty( )" method.

Device controls are controls that are attached to an entire device rather than one particular property of a device. Device controls are often composite objects and often contain property controls within them. Device controls represent a "quick and dirty" interface to the device, and may provide access to the more commonly-used information or controls for a device. Device controls may be used, if present, to represent a particular device in the all devices screen.

The screens sub-section of the user interface section contains an array of screen objects that are used by the device control application 115. Each screen represents a page in the UI flow, where each page is a navigation destination for the device control application 115. Each screen listed in this section should have a name, which is application-defined, and a class, which should refer to an existing class (e.g., a Java or Swift class) in the project. Additionally, screens may include a title string reference that is displayed in a menu or title bar, and a configuration section used to specify details about how the screen should be presented.

Screens may be referenced in the configuration file 118 and throughout the device control application 118 by the screen name. The application development framework 162 provides methods to find and instantiate screens within code, allowing custom application code to seamlessly work within the application development framework 162 to create a working device control application 115 with minimal effort. The application development framework 162 provides a large set of screens to choose from that handle many of the most common IoT tasks, including device setup and registration, sharing, contacts, sign-in, etc. While these screens are customizable to a degree via configuration settings, some applications will want custom UI or functionality that the application development framework 162 does not provide. Custom screens may be written by the application developer and can be used throughout the device control application 115 like any of the built-in screens. Screens can be passed information from the configuration file 118 via name/value pairs stored in the optional "config" section of each screen. In one embodiment, device control application 115 includes at a minimum a home screen and a sign in screen. Additional screens are provided in the application development framework 162, and may be added to a drawer menu of the device control application 115 if desired, or navigated to from other screens and/or from code via the application flow. In addition providing a set of available screens, the application development framework 162 supports custom screen classes that can be added to the application development framework 162 and used in device control application 115. To use a custom screen, a developer simply derives a new screen class from the screen base class and references the new screen class it from the configuration file 118. As with provided screens, custom screens can be updated and modified via the configuration file 118.

FIGS. 5-28 illustrate various examples of screens that may be used in a device control application. FIGS. 29-34 illustrate various examples of controls that may be used in a device control application.

Figure 5:
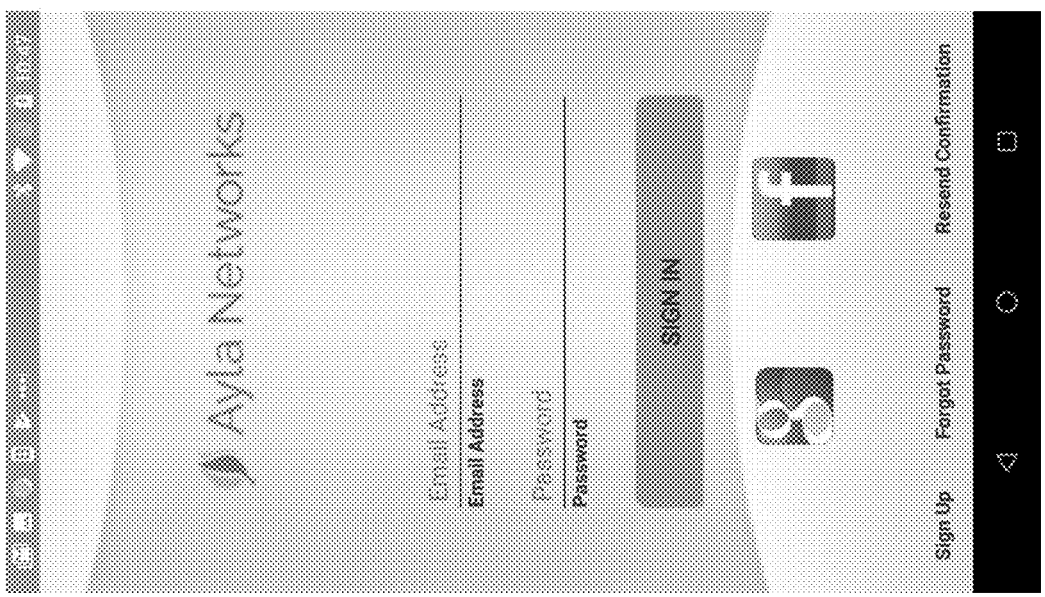
FIG. 5 illustrates an example sign in screen of a device control application.

FIG. 5 illustrates a sign-in screen of a device control application generated at runtime of the device control application from a configuration file. The sign-in screen may be the first screen visible to a user that is not signed in to the device control application 115. The sign-in screen provides an interface that allows the user to sign in to the WAN accessible services 130 via phone number, email, Google, Facebook or WeChat, for example. It also contains a button to launch the account details screen to create a new account, and links to re-send account confirmation as well as a "forgot password" link. This screen is not presented if the user has already signed in and can refresh authorization.

Figure 6:
FIG. 6 illustrates an example all devices screen of a device control application.

FIG. 6 illustrates an example all devices screen of a device control application.

Figure 8:
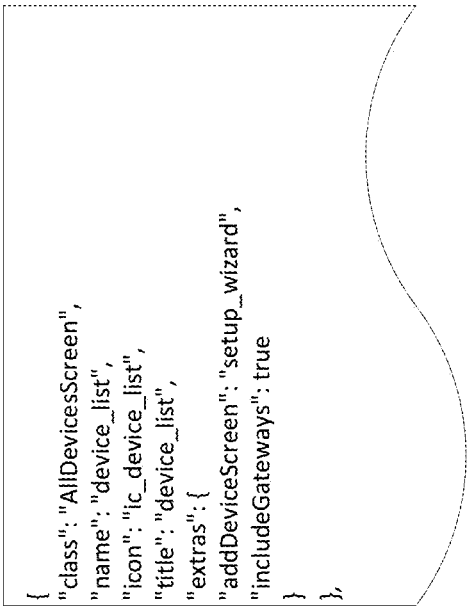
FIG. 8 illustrates configuration information used to generate the all devices screen of FIG. 7.
Figure 7:
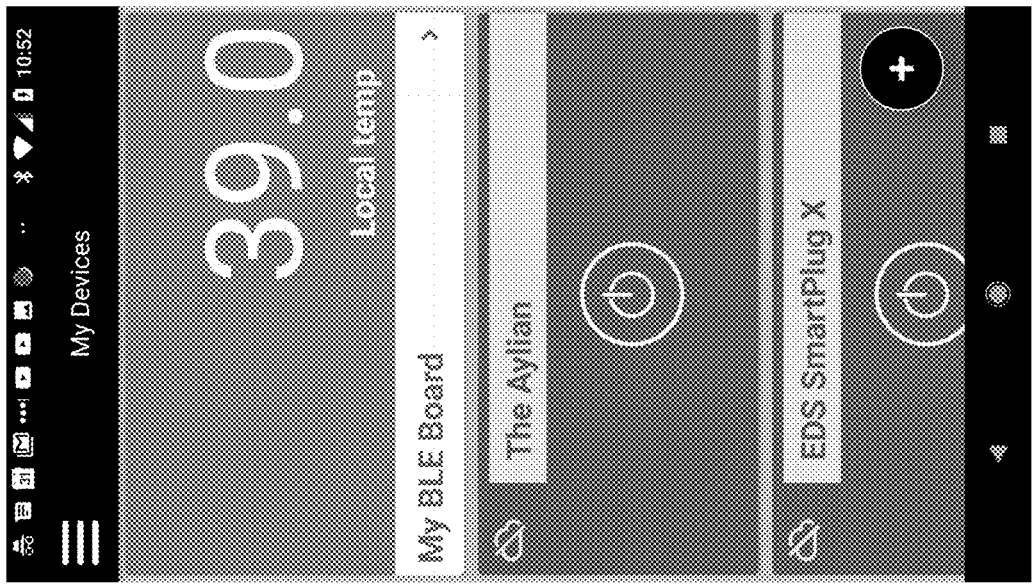
FIG. 7 illustrates an example all devices screen of a device control application.

FIG. 7 illustrates an example all devices screen of a device control application. FIG. 8 illustrates configuration information used to generate the all devices screen of FIG. 7. The all devices screen may be the default "homeScreen" used as a default configuration file 118. This screen displays a list of all devices registered to a user, as well as an "add" button ("+") that launches a screen to help add new devices. This screen may be configured by setting the extra, "addDeviceScreen", with the screen name that should be launched when the button is tapped. When devices are selected (tapped) from the all devices screen, the "device detail" screen for that particular device is launched. Devices may indicate the screen that should be displayed when they are tapped by setting the "device detail screen" field in the device's configuration information in the configuration file 118.

Many different device details screens may be used, where each device details screen may be optimized for presenting information for and controlling a particular type of device. A specific device details screen is launched in response to a tap from the all devices screen for devices that specify that specific device details screen in their configuration information.

Figures 9, 10:
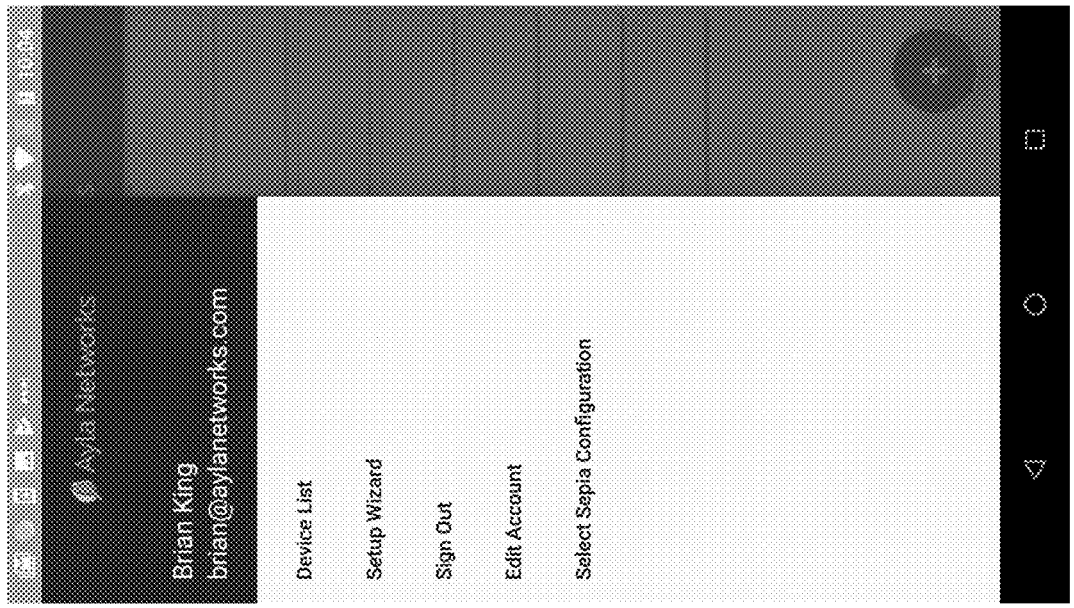
FIG. 9 illustrates an example drawer menu of a device control application.
FIG. 10 illustrates configuration information used to generate the drawer menu of FIG. 9.

FIG. 9 illustrates an example drawer menu of a device control application. FIG. 10 illustrates configuration information used to generate the drawer menu of FIG. 9.

Figures 11, 12:
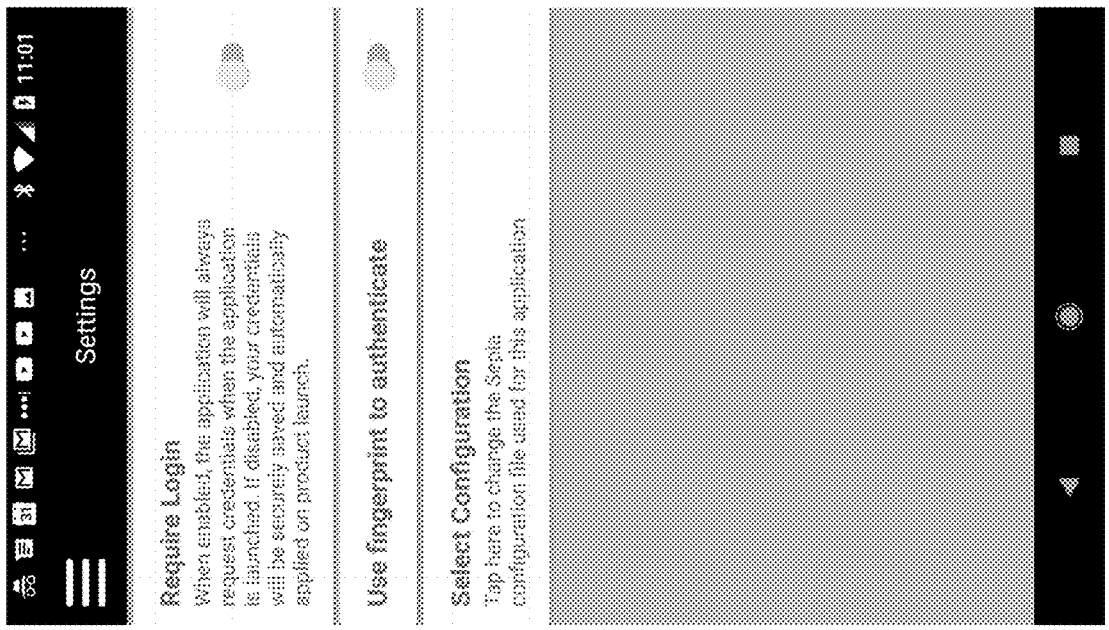
FIG. 11 illustrates an example settings screen of a device control application.
FIG. 12 illustrates configuration information used to generate the settings screen of FIG. 11.

FIG. 11 illustrates an example settings screen of a device control application. FIG. 12 illustrates configuration information used to generate the settings screen of FIG. 11. The settings screen may be used to provide user-changeable application settings for personal customization. The screen uses an application settings class to manage the settings in an embodiment. Application settings may be defined in a separate section of the configuration file 118, and may be used by the application settings screen to allow the end-user to override defaults. Settings may be defined in the configuration file 118 along with their default values. Changes made via the settings screen will persist between application launches, and may be obtained anywhere in the application using an application settings class. An example for an HVAC application might have an option to choose between Celsius and Fahrenheit for temperature display. The particular settings and their defaults may be defined in the application settings section of the user experience section of the configuration file 118.

Figure 14A:
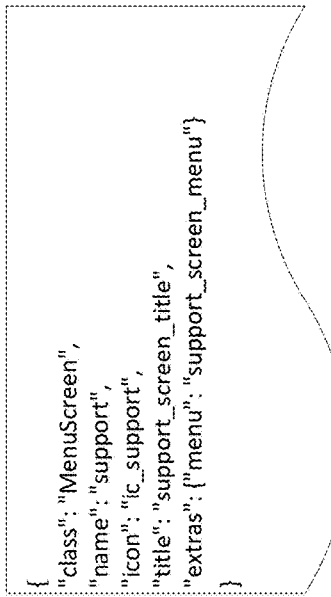
FIGS. 14A-B illustrate configuration information used to generate the menu screen of FIG. 13.
Figure 14B:
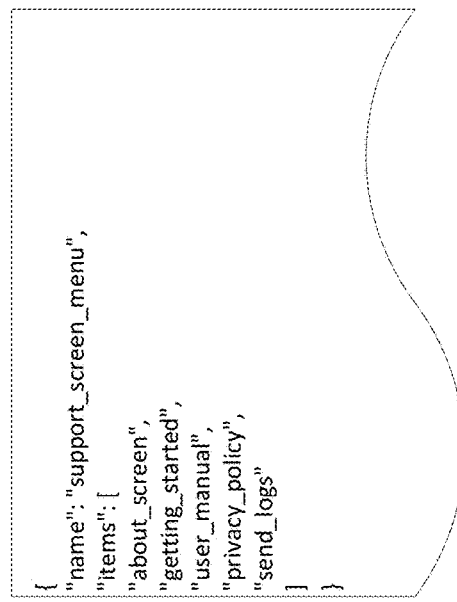
Figure 13:
FIG. 13 illustrates an example menu screen of a device control application.

FIG. 13 illustrates an example menu screen of a device control application. This screen displays the contents of a menu from the configuration. Rather than displaying a context menu, developers may instead launch a menu screen to display the contents of a menu for the user to select from. This is useful to allow easy creation of drill-down menus from the configuration file alone. FIGS. 14A-B illustrate configuration information used to generate the menu screen of FIG. 13.

Figure 16A:
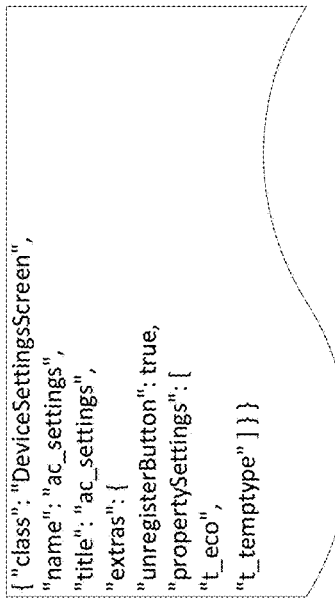
FIGS. 16A-B illustrate configuration information used to generate the device settings screen of FIG. 15.
Figure 16B:
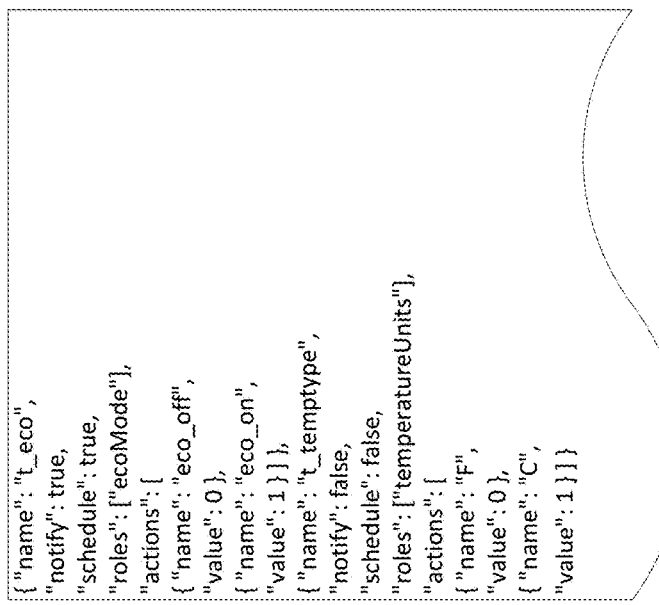
Figure 15:
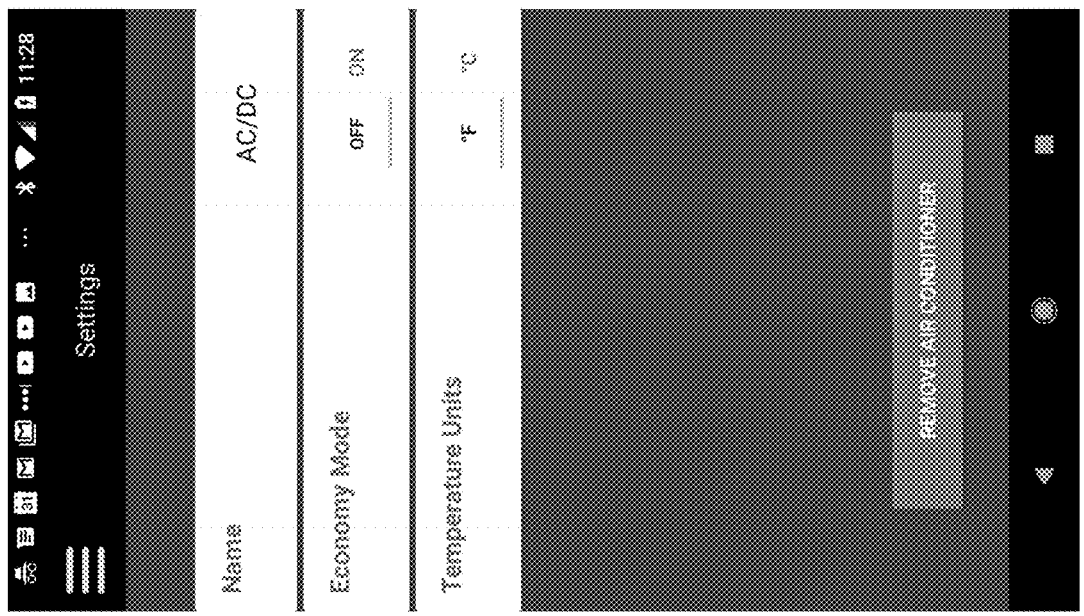
FIG. 15 illustrates an example device settings screen of a device control application.

FIG. 15 illustrates an example device settings screen of a device control application. FIGS. 16A-B illustrate configuration information used to generate the device settings screen of FIG. 15. The device settings screen can be used to configure settings of a particular device that are managed through its properties. These settings are tied to property values from the configuration file 118. For example, an air conditioner unit might have a display setting for the unit that can be configured in Fahrenheit or Celsius via setting a property to 1 or 0. The device settings screen would be informed of this particular property, and would present a user interface based on the property's actions allowing the property value to be changed.

The "extras" field of the device settings screen allows for the display of an "unregister" button (to unregister the device) as well as an array of managed property names that should be offered as device setting options. The actions associated with the managed properties are used to determine the valid values for these properties. The screen's configuration as shown specifies that an unregister button should be shown (e.g., "remove air conditioner") and that "t_eco" and "t_temptype" properties should be used as configuration options for the device. When the user changes a setting, the associated property is changed on the device.

In the provided example, the "t_eco" property is used to turn_on and off "eco mode" on an air conditioner. The "t_eco" property is defined to have two actions, "eco_on" and "eco_off" with the values 1 and 0 respectively. The "t_temptype" is similarly defined to have values for "C" and "F". The example defines a screen called "ac_settings" that allows the user to change the values of t_eco and t_temptype to "on/off" or "C/F".

Figure 18:
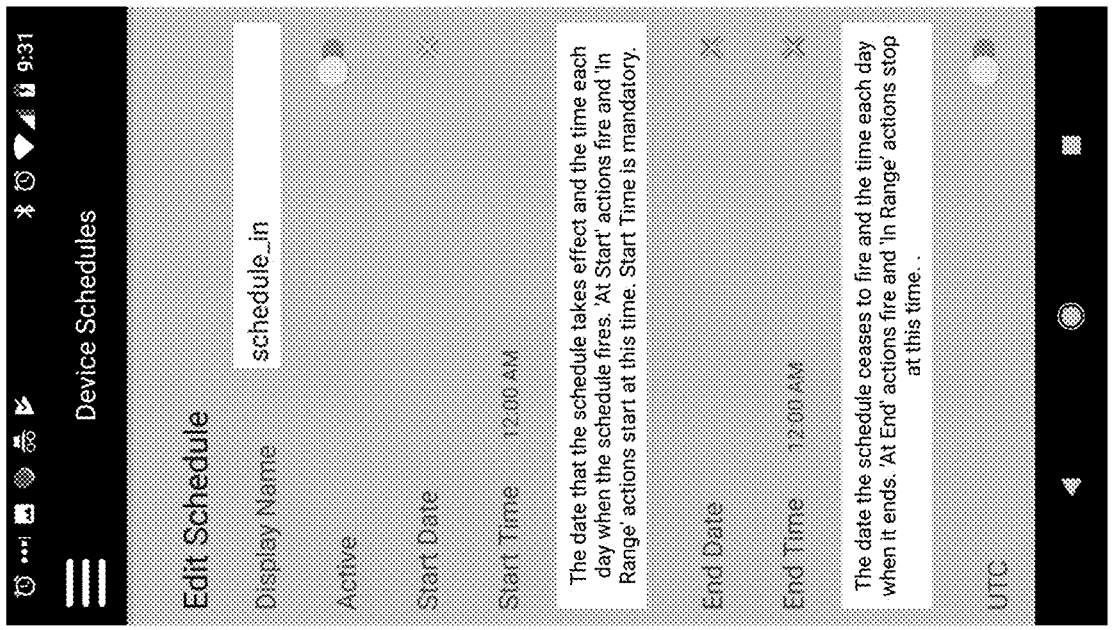
FIG. 18 illustrates an example schedule list screen of a device control application.
Figure 17:
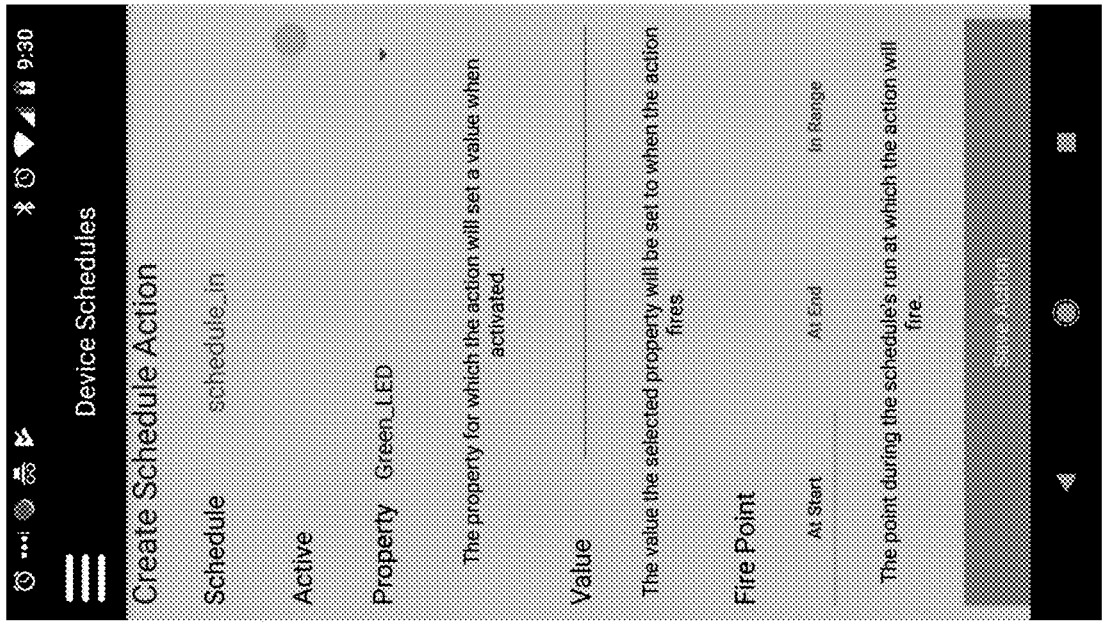
FIG. 17 illustrates an example schedule action screen of a device control application.

FIG. 17 illustrates an example schedule action screen of a device control application. FIG. 18 illustrates an example schedule list screen of a device control application. The schedule screen provides an interface to edit a schedule's settings. It contains a link to the schedule action screen to configure actions.

Figure 19:
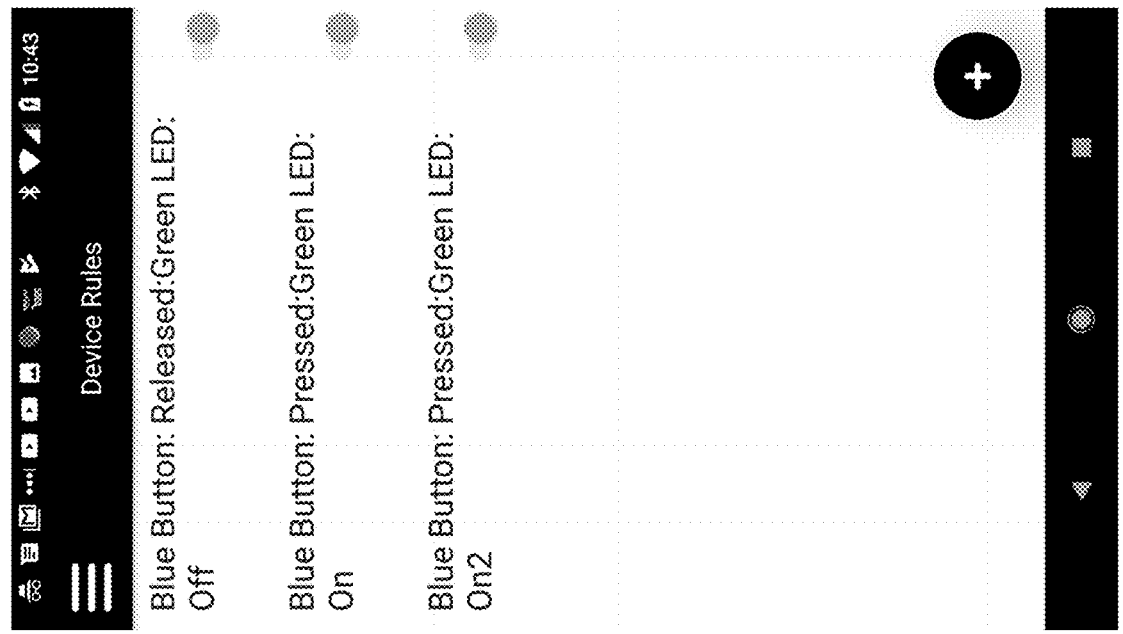
FIG. 19 illustrates an example device rules screen of a device control application.

FIG. 19 illustrates an example device rules screen of a device control application. The device rules screen displays the list of rules set up on a particular device, as well as an add button that can be used to add a rule. The add button may launch an add rule screen when pressed in embodiments. Each rule displayed in the device rules screen has a switch that allows the rule to be easily enabled or disabled. Long-pressing on a rule prompts the user to delete the rule in embodiments.

Figure 20:
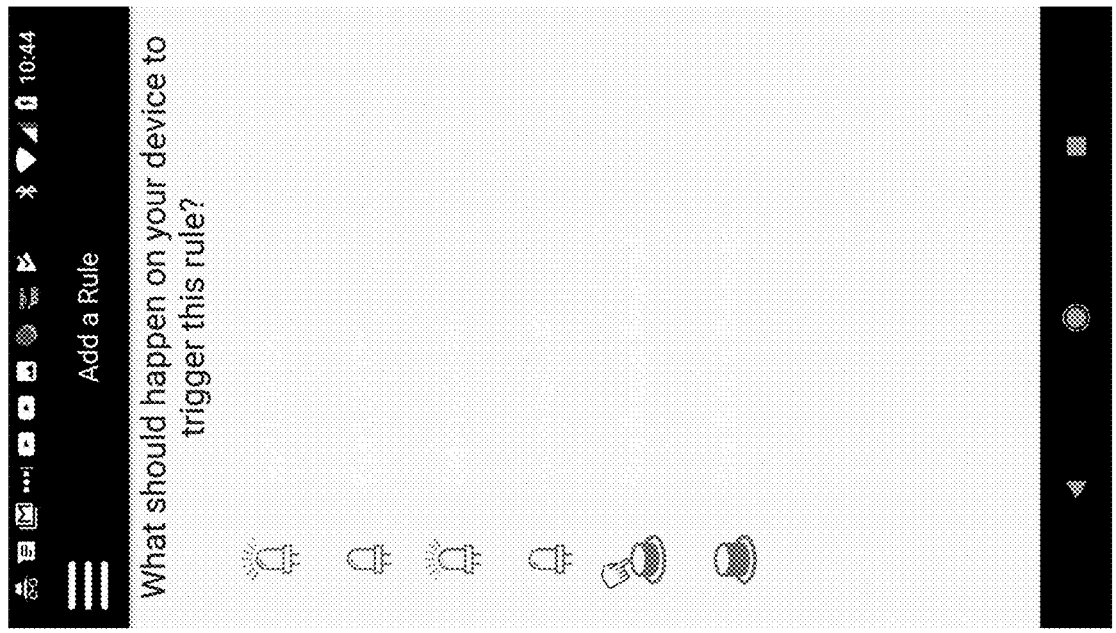
FIG. 20 illustrates an example add rule screen of a device control application.

FIG. 20 illustrates an example add rule screen of a device control application. The add rule screen displays a wizard allowing a user to create a new rule for a selected device. The set of available actions for rules are taken from the configuration's managed properties' action fields.

Figure 21:
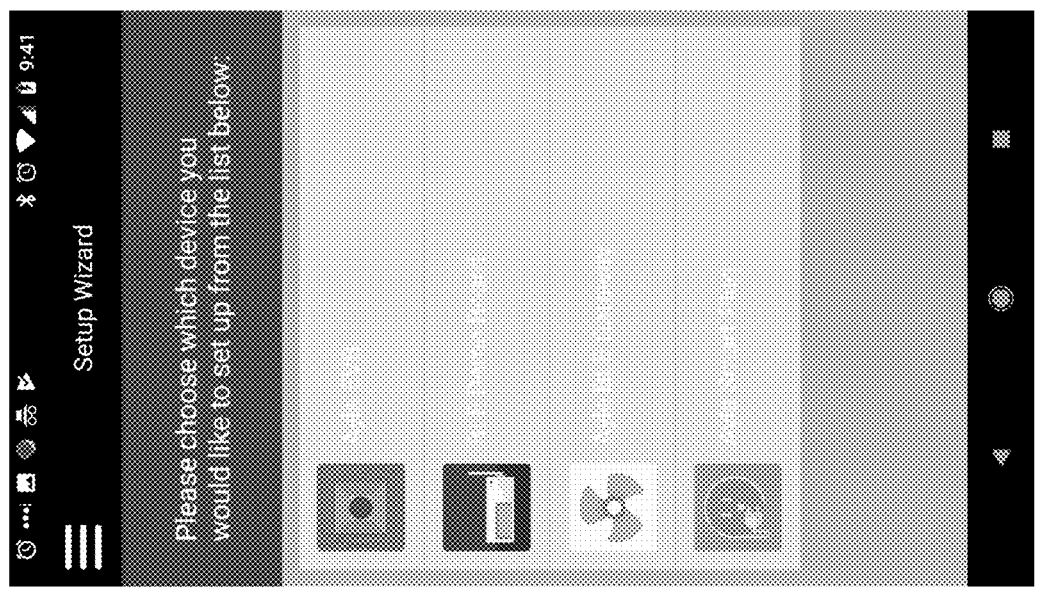
FIG. 21 illustrates an example device setup wizard screen of a device control application.

FIG. 21 illustrates an example device setup wizard screen of a device control application. This screen takes the user through a step-by-step process to add a new device to their home network and user account. Specific information about the devices such as registration type, SSID regular expression to find the device, etc. is taken from the device configuration section of the configuration file 118. Some registration flows may require additional steps. The messaging of these steps may be provided via string references in the configuration extras for the screen. Some "extras" for the setup wizard screen include a prerequisite text field, a prerequisite help field and a mode field. The prerequisite text field may include instructions for the user that they can confirm with a yes/no response. An example might be, "Is your air conditioner plugged in and powered on?" This text is displayed to the user at the start of the flow, if present, and yes/no buttons are provided to receive the response. The prerequisite help field may include further instructions to be displayed to the user if the answer to the "prerequisite text" question was "no". An example might be, "Plug in and power on your air conditioner by toggling the switch near the back of the unit". The mode field, if set to "register", may cause the device discovery (Wi-Fi setup) steps to be skipped, and only attempt to register the device rather than set up its network.

An example flow for the device setup wizard screen is as follows:
1. Determine the type of device the user wants to set up.
2. Find the device in a scan. This includes scanning for Wi-Fi access points, local BLE devices or requesting a gateway to discover nodes. The type of scan performed will depend on the type of the selected device.
3. Connect to the device and obtain additional information about it.
4. Prompt the user for Wi-Fi credentials or a passkey, if required.
5. Connect the device to the local Wi-Fi network (for Wi-Fi devices).
6. Obtain registration information from the user or device, depending on the type of registration.
7. Register the device with the WAN accessible services 130.
8. Prompt the user to customize the device by naming it, setting its location information, etc.

Figure 22:
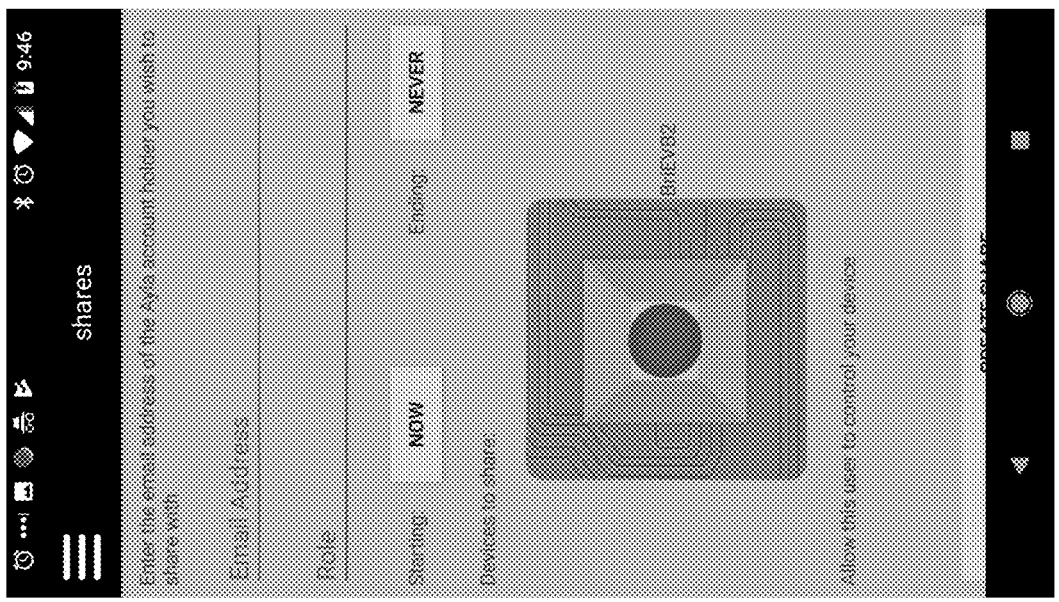
FIG. 22 illustrates an example device shares screen of a device control application.

FIG. 22 illustrates an example device shares screen of a device control application. This screen provides an interface for the user to share a device with another person.

Figures 23, 24:
FIG. 23 illustrates an example about screen of a device control application.
FIG. 24 illustrates configuration information used to generate the about screen of FIG. 23.

FIG. 23 illustrates an example about screen of a device control application. The about screen may be shown to provide information about a device control application 115. The about screen uses the "extras" fields to allow a developer to customize content and appearance of the screen. A mapping of strings to Booleans in the configuration information for the about screen indicates which items to display in the about screen. All items marked as true will be displayed in the about screen. FIG. 24 illustrates configuration information used to generate the about screen of FIG. 23.

Figure 26:
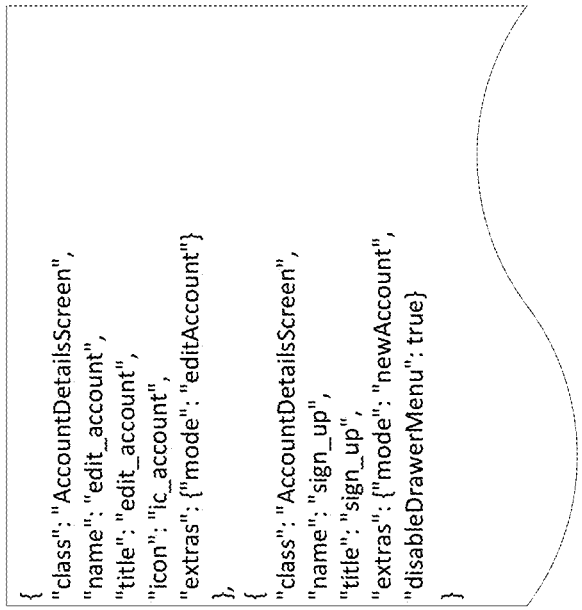
FIG. 26 illustrates configuration information used to generate the account details screen of FIG. 25.
Figure 25:
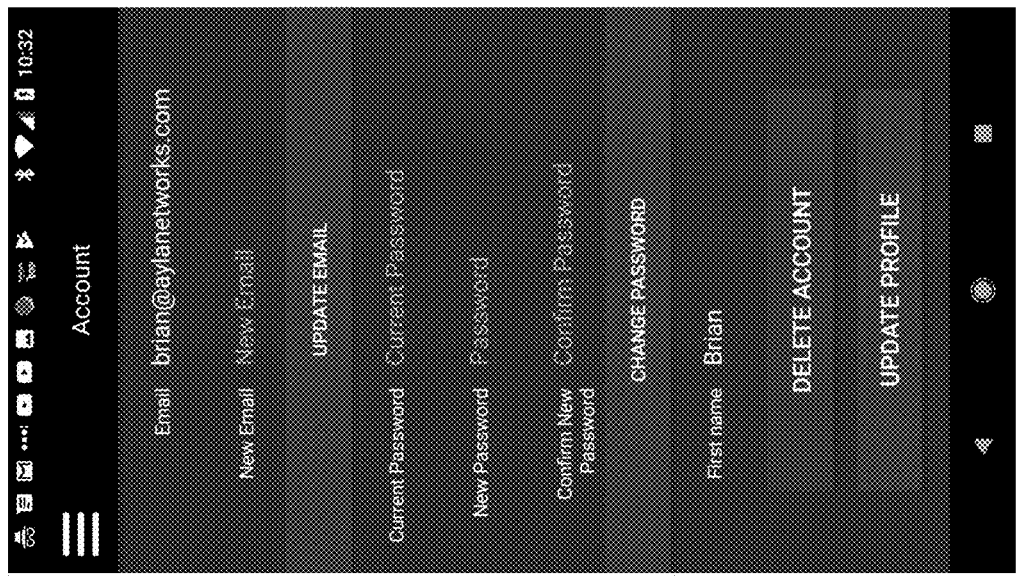
FIG. 25 illustrates an example account details screen of a device control application.

FIG. 25 illustrates an example account details screen of a device control application. The account details screen provides the user with editable account information. This screen may be used to sign up a new user, or for an existing user to edit their account details. The account details screen provides edit fields a user can use when creating or editing an account. This screen is used both for the "sign-up" and "edit account" views within the application. The account details screen may use a "mode" extra to determine whether or not the screen is meant for a new user or to edit an existing account. FIG. 26 illustrates example configuration information used to generate the account screen of FIG. 25. The illustrated example shows two different screen entries using the account details screen. The first screen, shown in FIG. 25, will launch filled out with a user's account information. The second screen will launch empty and prompt a user to create a new account. The entry named "edit account" uses the "extras" field to specify the screen's mode as "edit", while the "extras" field for the "sign_up" version of this screen sets the mode to "sign_up" as well as hiding the title bar and disabling the drawer menu while that screen is active.

A device rules screen may be used to display a list of rules. Each rule in the device rules screen may be presented along with a switch that enables a user to activate or deactivate that rule. The device rules screen may also include a button that may cause the device control application 115 to navigate to an add rule screen.

Figure 28:
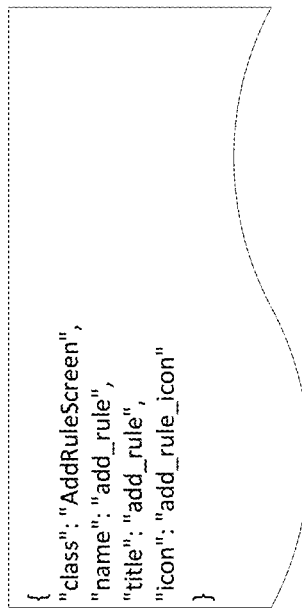
FIG. 28 illustrates configuration information used to generate the add rule screen of FIG. 27.
Figure 27:
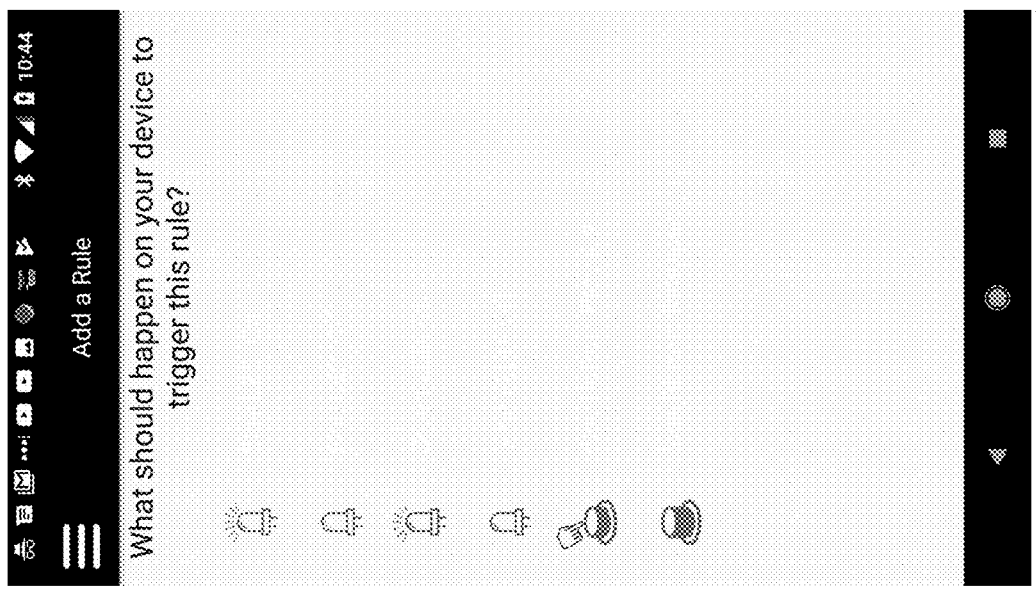
FIG. 27 illustrates an example add rule screen of a device control application.

FIG. 27 illustrates an example add rule screen of a device control application. The add rule screen provides an interface for the user to add a rule to a device. The screen should be launched from a screen that has a device context, such as the device details screen or any screen that shows information about a device. FIG. 28 illustrates configuration information used to generate the add rule screen of FIG. 27.

Many additional screens may be used, which may be generated by a developer or may be natively included in the libraries of the application development framework 162. Some additional screens that are not illustrated include a choose configuration screen, a device swipe container screen, a hypertext markup language (HTML) view screen, a menu screen, and a no device screen. The choose configuration screen allows a user to select a different configuration file to use with the device control application 115. Upon selecting a new configuration file, the device control application 115 is re-started using the selected configuration file. The device control application may be completely different after the restart due to the different configuration information included in the newly selected configuration file.

A device swipe container screen is an alternative to the all devices screen for the root screen. The device swipe container screen provides a left-to-right swipable interface that is populated with the "device detail" screens for each device registered to the account. If this screen is used instead of the all devices screen, the user is presented with the details screen of a single device at a time, with the ability to swipe between devices.

An HTML view screen may be used to contain web content. For example, a "help" menu item might be configured to launch a browser with a specific universal resource locator (URL). In an example, to add a menu item that launches a webview pointing to haps://www.aylanetworks-.com/privacy-policy, the configuration file 118 would include an HTML view screen configured as set forth below, and could be launched from the menu simply by adding a menu item named "privacy_policy".

```
{
    "class": "HTMLViewScreen",
    "name": "privacy_policy",
    "title": "privacy_policy",
    "icon": "privacy_policy_icon",
    "extras": { "htmlUrl": "https://www.aylanetworks.com/privacy-policy",
       "launchInBrowser": true }
}
```

Configuration options specified in the "extras" of the HTML view screen may include an HTML resource field, an HTML URL field and a launch in browser field. A value of the HTML resource field may be a string resource identifier pointing to HTML content to be displayed in the view. A value of the HTML URL field may be a URL to be loaded in the view. A value of the launch in browser field may be true or false. If true, the HTML content may be launched in an external browser. If it is false, then the HTML content may be included within a web view in the device control application 115.

A menu screen may present contents of a menu as a full-screen scrolling list. The specific menu to be displayed may be indicated with an entry called "menu" in the "extras" field of the screen.

A no devices screen may be the default screen to display when no registered devices exist on an account to which a user has logged in on the device control application 115. Rather than displaying an empty list, this screen contains instructions on how to add a new device by tapping the add button.

UI controls such as switches, sliders and other widgets within device control application 115 are defined in the controls sub-section of the user experience section. Controls are most often used to control or present information from a device 135A-C. Examples of controls include sliders, thermostats, switches, color pickers, buttons, dials, and so on. Depending on the nature of the device 135A-C, sliders, thermostats, switches, color pickers, dials, etc. might be the best way to change or represent the state of the device 135A-C. Controls, like screens, can be customized via the configuration file 118. Controls may include a name field that specifies a name of a control, which may be used elsewhere in the configuration file 118 to refer to a specific control. Controls may also include a class field that specifies a class associated with the control. The class may be, for example, a Java or Objective C class name. Controls may also have a field called "extras" that allows custom parameters to be passed to the control when it is created. Multiple versions of controls may be created with different configuration parameters if desired. Controls, similar to screens, are referenced by name and can be provided additional information via a "config" section. Screens that allow control of a device will check each property for a "control" reference, and present that control to the user for that property.

The example configuration information for configuration file 118 set forth in FIG. 35 defines two controls using a "ACDeviceControl" class, included with application development framework 162. One control uses one color scheme defined in the "extras" section, and the other uses a different color scheme.

One type of control is an action picker control. An action picker control is backed by a managed property that has a set of actions defined. The default display of the action picker control is an icon and text field with the selected action. When tapped, the action picker presents the set of actions for that managed property to the user and updates the property value when a particular action from the set of actions is selected. FIG. 29 illustrates an example action picker control of a device control application. The current selection is displayed when the pop-up is not active. FIG. 30A illustrates configuration information 3000 associated with the action picker control. The action picker control requires at a minimum that the associated property is defined, as set forth in configuration information 3000 from FIG. 30A. Additional configuration options include the text color and background color for the items. The contents of the control are determined by the Actions defined for the selected property. FIG. 30B illustrates configuration information used to generate the action picker control of FIG. 29.

Figures 31, 32:
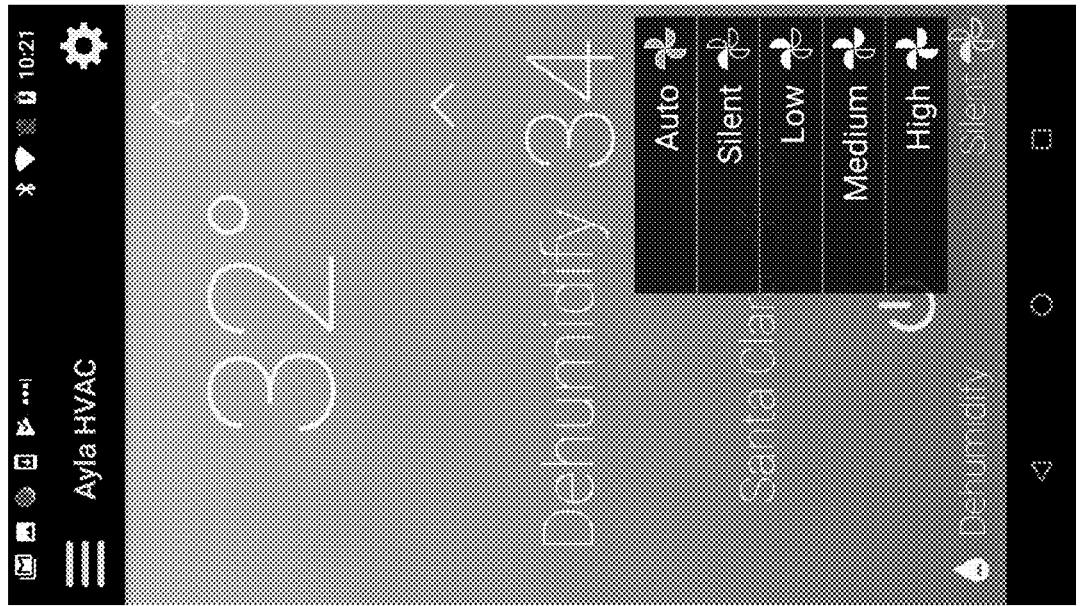
FIG. 31 illustrates an additional example action picker control of a device control application.
FIG. 32 illustrates configuration information used to generate the action picker control of FIG. 31.

FIG. 31 illustrates an additional example action picker control of a device control application. FIG. 32 illustrates configuration information used to generate the action picker control of FIG. 31.

Another type of control is a connectivity indicator control that displays the connection status of a device. The connectivity indicator control may include an on image field that specifies an image to display when the device is connected and an off image field that specifies an image to display when the device is not connected.

Another type of control is an on/off control that may be used to toggle a Boolean property between on and off.

Figure 34:
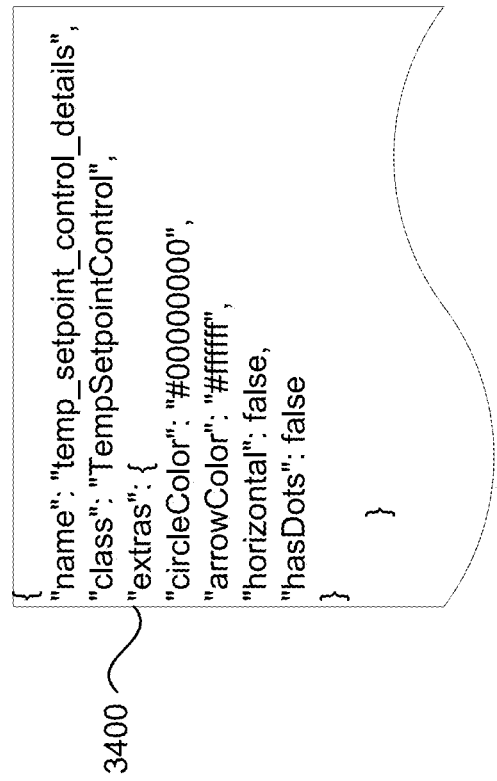
FIG. 34 illustrates configuration information used to generate the temperature control.
Figure 33:
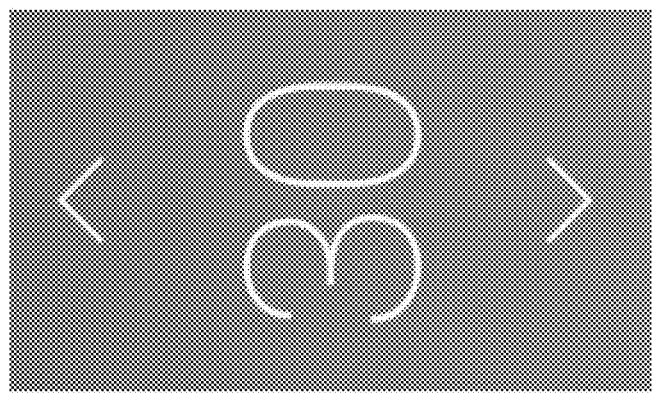
FIG. 33 illustrates an example temperature control of a device control application.

FIG. 33 illustrates an example temperature setpoint control of a device control application. The temperature setpoint control is used to set a temperature, and is most often used in heating, ventilation and air conditioning (HVAC) units. The temperature setpoint control displays the temperature value in the center and contains arrows either to the top and bottom or left and right, depending on the control orientation. This control looks for a role called "temperature setpoint" to find the appropriate property to use for the temperature value. FIG. 34 illustrates configuration information 3400 used to generate the temperature control of FIG. 33. The configuration information 3400 includes a circle color field that indicates a color of the circle drawn around the current temperature, which may be set to transparent if it should not be shown. The configuration information 3600 additionally includes an arrow color field, a horizontal field (which if true causes the arrows to be displayed horizontally rather than vertically) and a "hasDots" field that will cause dots or other graphics to be down between the temperature and the arrows.

The ability to customize and re-use screens and controls within device control application 115, a powerful feature of the application development framework 162. Each screen or control in the application may be used in a variety of situations and presented in a variety of formats. Both screens and controls may have a field called "extras" in their configuration, as set forth above. This field may be used to pass information to the object when it is created to customize its appearance or behavior. Multiple configurations of the same screen or control can exist side-by-side within a single configuration and used as independent objects.

In an example, a simple device may have two properties that control LEDs, one blue and one green. These properties are named Blue_LED and Green_LED respectively. Each of these properties will use the same control, the LED control, though one should appear blue and the other green. To accomplish this, two control objects are created in the configuration file 118 using the same class, LED control, as set in FIG. 36A.

The "extras" field for the LED control allows for the color to be specified via an "ledColor" value. This essentially creates two separate controls that may be referenced by the configuration file 118, "led_light_green" and "led_light_blue". In order to tie the properties "Blue_LED" and "Green_LED" to these particular controls, a developer simply updates the control field in the managed properties section for the device to indicate that these controls are what should be used to represent these properties, as set forth in FIG. 36B.

In addition to providing the framework with information about the properties, specifying the actions available for a property allow the property to be used within an action picker control, a powerful control provided by the application development framework. For example, actions are defined for an A/C unit fan control in configuration information 3200 of FIG. 32. Elsewhere in the configuration, an action picker control may be defined using the below property.

```
{
    "name": "ac_fan_picker",
    "class": "ActionPicker",
    "extras": {
        "property": "t_fan_speed",
        "textColor": "#ffffff",
        "backgroundColor": #00000000"
    }
},
```

These combination of configuration information elements resulted in a screen beings created that added the "ac_fan_picker" control UI element, as shown in FIG. 31. These linked entries in the configuration file 118 allow the UI to create the control populated with the necessary names and icons, and will automatically set the property to the desired value when an item is selected from the control's list. The example FIGS. 29-30B show the same control configured to use a different property, the "mode control". Accordingly, the same control may be used for a different property (that different property having a different configuration).

The colors sub-section of the user experience section in a configuration file 118 allows named colors to be defined. Having a central location for color definitions makes it easy to customize the entire device control application 115 by changing the color values in this section. Colors are defined with a name and a value, which is a hexadecimal string akin to hypertext markup language (HTML) color definitions. Example color definitions are provided below.

```
"colors": [
    {"name": "primary_color", "value": "#006998"},
    {"name": "heatColor", "value": "#F76707"},
    {"name": "coolColor", "value": "#0093C7"},
    {"name": "offColor", "value": "#4a4a4a"},
    {"name": "dehumidifyColor", "value": "#00ccdd"}
]
```

The User Experience section may contain variables for a sign in screen and for a home screen. These variables let the framework know where to start the application flow when the device control application 115 is started. In one embodiment, if the user is signed in, the home screen will be the first screen to display. In one embodiment, if the user has not yet signed in, the sign in screen will be displayed. These variables should be set with a screen name for every device control application 115 in embodiments.

Depending on the configuration, a drawer menu may be instantiated to allow many screens to be accessed from a single location. Additionally, screens may be configured with UI elements to launch other screens. For example, a device list screen, included with application development framework 162, may launch the device details screen for a device when tapped in the list.

If the device control application 115 is to navigate via a drawer menu, this variable should be set with an array of screen names in the order they should be presented in the menu. Each screen listed in this section will be displayed in the drawer menu using the screen's icon and title. Users may tap on any of the items in the drawer menu to launch the indicated screen.

In embodiments, the entry point into the device control application 115 is the primary class (e.g., a "mainActivity" class). The device control application 115 may derive its primary class from a base class, which drives the application flow. The base class may contain several helpful methods that can be leveraged by custom application code to allow new components to work within the framework of the device control application 115 and application development framework 162. Some example methods of the base class are provided. A "sharedInstance" method can be called to obtain an instance of the primary class from anywhere in the device control application 115. A "getSessionManager" method may be called to return an active session manager. A "getDeviceManager" method may be called to return an active device manager. A "loadConfiguration" method may be called to initialize a framework of the device control application 115 with a specified configuration file 118. A "startApplication" method may be called after the "loadConfiguration" method to start an application flow for the device control application 115. A "signInComplete" method may be called once a user has successfully signed in. A "resIdFromName" method may be called to return a resource ID from a resource name string. A "navigateHome" method may be called to return navigation of the device control application 115 to a home screen. A "createScreen" method may be called to instantiate a screen. A "pushScreen" method may be called to push a screen into a navigation stack of the device control application. A "sessionClosed" method may be called when a user signs out or their authorization expires.

The user experience section of the configuration file 118 may additionally include an application settings sub-section, which may define the settings of the device control application that may be changed by a user. An application settings object may include a name field for a name of the setting, a type field that indicates a type associated with the setting (e.g., Boolean, string, integer, decimal, multiple choice, etc.), a default value field for a default value of the setting, and a choices field, which may have one or more user choices (e.g., an array of choices in the case of a multiple choice type).

A configuration file 118 may additionally include a templates section. Templates are used to format messages (e.g., email and simple message system (SMS) messages) sent to a user. These messages are used to confirm email addresses or phone numbers, or simply to provide information to the user. Templates are defined in the WAN accessible services 130, and are given a unique identifier. The templates section in the configuration file 118 allows the developer to link template IDs with the device control application 115, and thus enables the device control application 115 to trigger execution of particular templates on the WAN accessible services 130.

Figure 3:
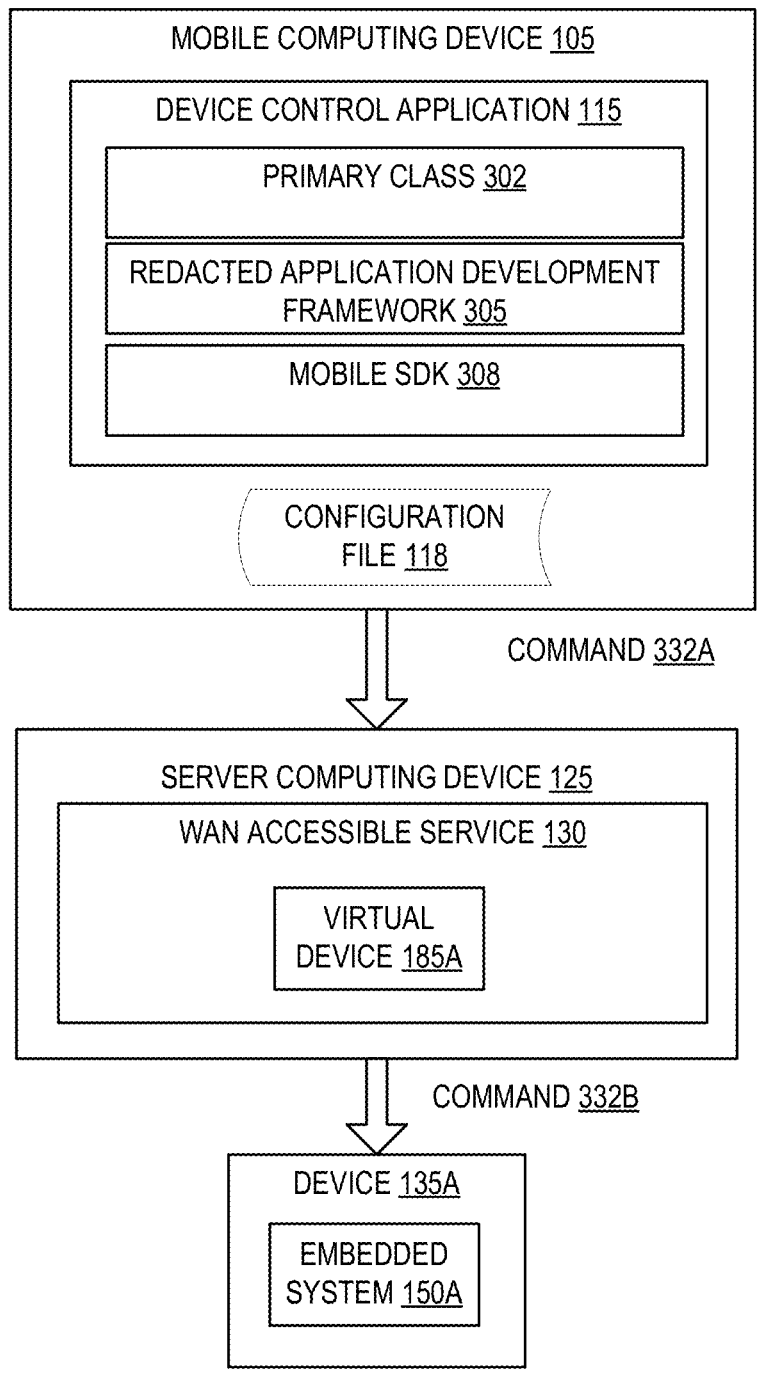
FIG. 3 is a block diagram depicting control of a network-connected device using a device control application running on a remote mobile computing device, in accordance with embodiments of the present disclosure.

FIG. 3 is a block diagram depicting control of a network-connected device 135A using a device control application 115 running on a remote mobile computing device 105, in accordance with embodiments of the present disclosure. When the device control application 115 is started, the operating system loads the primary class 302 (e.g., "mainActivity" or "UIApplication") just like any normal Android or iOS application. From here, the device control application 115 calls a method of the primary class 302 called "loadConfiguration( )" to initialize a redacted version of the application development framework 305 with the configuration file 118. The redacted version of the application development framework 305 is included in the device control application 115. The redacted application development framework may be a library in which much of the classes and/or resources have been stripped out during an optimization phase of compiling the device control application 115. The method "loadConfiguration( )" will return null on success, or an array of error messages if errors were found in the configuration file 118.

Once the configuration file 118 is loaded successfully, the device control application 115 calls a method "startApplication( )" to hand control of the application over to the redacted application development framework 305. The redacted application development framework 305 then takes over the control flow of the application, presenting the application interface, menus and screens based on the configuration file 118.

When "startApplication( )" is called, the device control application initializes the mobile SDK 308 using values read from the configuration file 118, and first determines whether the user is signed in, or can sign in using cached credentials (e.g. a refresh token from a previous session).

If the user does not need to provide credentials, the application authenticates with the WAN accessible service 130 using the cached credentials. If the sign-in is successful, the home screen is launched. This screen is defined in the configuration in the user experience section. FIG. 6 illustrates an example home screen.

If the system cannot authenticate the user for any reason, the sign in screen is presented to the user. Once the user has authenticated through the sign in screen, the home screen is presented. FIG. 5 illustrates an example sign in screen. These screens are defined in the user experience section of the configuration file 118.

The first screen presented to the user after a successful sign-in is the home screen, defined in the configuration file 118. This screen should be considered the "main" screen of the application, and should provide the most-used functionality of the application. The application development framework 162 provides a collection of home screens that may be used, or developers may create their own. Some home screens provided are the all devices screen and device swipe container screen, both of which are described above.

Additionally, developers may create their own screen classes (derived from a screen base class). Custom screen classes may be referenced identically to built-in screen classes.

Each device control application 115 will have different requirements for navigation. Some screens or controls have pre-defined navigation behavior, such as tapping on a device in the all devices screen will launch the details screen for a particular device.

The application development framework 162 allows for the creation of menus for navigation. Menus are simple structures in the configuration file 118 comprised of a name and an array of "items". Each item is a string value that may refer to a screen name, which would result in the screen being pushed when the item is selected, or another value which is passed to the application via a call to the primary class's "handleDrawerMenuItem( )" method, in the case of a drawer menu, or will call a screen's "handleContextMenuItem( )" in the case of a screen's context menu item being selected.

When presented to the user, the menu will attempt to find the display text first from the associated screen, if present, and if not present (in the case of an application-handled menu item) will look for an entry in the string table with the same name as the menu item. If not found, the menu item text itself will be displayed.

Once defined, a menu may be attached to any screen object by referring to it by name in the screen's "menu" field, or may be used as an application-wide drawer menu. To enable the drawer menu in the application, a developer may simply create a menu object in the configuration file 118 containing a list of screens (or other strings) and assign the name of this menu object to the "drawer menu" field of the "user experience" section of the configuration file 118. FIG. 7 illustrates an example drawer menu. FIG. 8 illustrates example configuration information 800 for a configuration file 118 that is used to populate the drawer menu of FIG. 7.

When a menu item is selected by a user, either in the drawer or from a context menu, the redacted application development framework 305 checks to see if the item is a reference to a screen name. If so, the screen will be rendered and shown to a user. If the item does not match any screen names, the item name is passed to the application via a call to a "handleDrawerMenuItem( )" method in the case of a drawer menu item being selected, or a screen's "handleContextMenuItem( )" method in the case of a context menu item from a screen being selected.

Being able to transition smoothly and easily between screens in device control applications generated from the application development framework is a simple and easy process. Screens can be launched automatically from any menu, whether the main navigation drawer menu or a context menu on any screen. These menus are defined in the configuration file 118 and "just work", as long as the menu names and screen names are the same. Additionally, any menu item that is not the name of a screen will be passed to the developer first to the active screen, and then to a base class if the screen did not handle it. This allows additional functionality that might not warrant a new screen being presented to be added to the application without difficulty. Screens themselves might contain buttons that link to other screens, launching them programatically when tapped. Examples include the default "device details" screen, which will present a button to launch the schedule list screen when tapped. This screen allows the specific schedule list screen to be overridden in its configuration by setting the "scheduleListScreen" field to a screen name. Developers may easily present a screen by calling one of the "pushScreen( )" application programming interfaces (APIs) on the base class.

Device control application 115 may include a screen associated with device 135A, and a user may navigate to that screen. The screen may show graphics associated with the device 135A and/or controls for controlling the device 135A. The controls may be specific to a device type of the device 135A. For example, if the device 135A is an HVAC system, then the controls may include a fan control object and an HVAC control object. Each control object may include one or more screen elements that a user may interact with to cause a particular command or set of commands to be sent to the device 135A. The screen, the graphics for the screen, the controls to include in the screen, the graphics for the controls, the device associated with the controls, and so on may be defined in configuration file 118. Also defined in the configuration file 118 may be other screens and associated controls, graphics, etc. as well as a workflow for transitioning between screens. A user may interface with a particular control included in the screen associated with device 135A. The interaction with the control may cause mobile computing device 105 to generate and send a command 332A to server computing device 125.

Server computing device 125 includes one or more WAN accessible services 130, which include a virtual device 185A associated with device 135A. The command 332A may cause a state of the virtual device 185A to change. The WAN accessible service 130 may then send a command 332B to embedded system 150A of device 135A to cause the same state change that was made on the virtual device 185A to also be made on the device 135A. The embedded system 150A may then send a response to WAN accessible service 130 that the command 332B was successfully executed, and WAN accessible service 130 may send a confirmation to device control application 115 that the command was successfully executed. The new state of the device 135A may then be shown in the screen of the device control application 115.

Figure 4A:
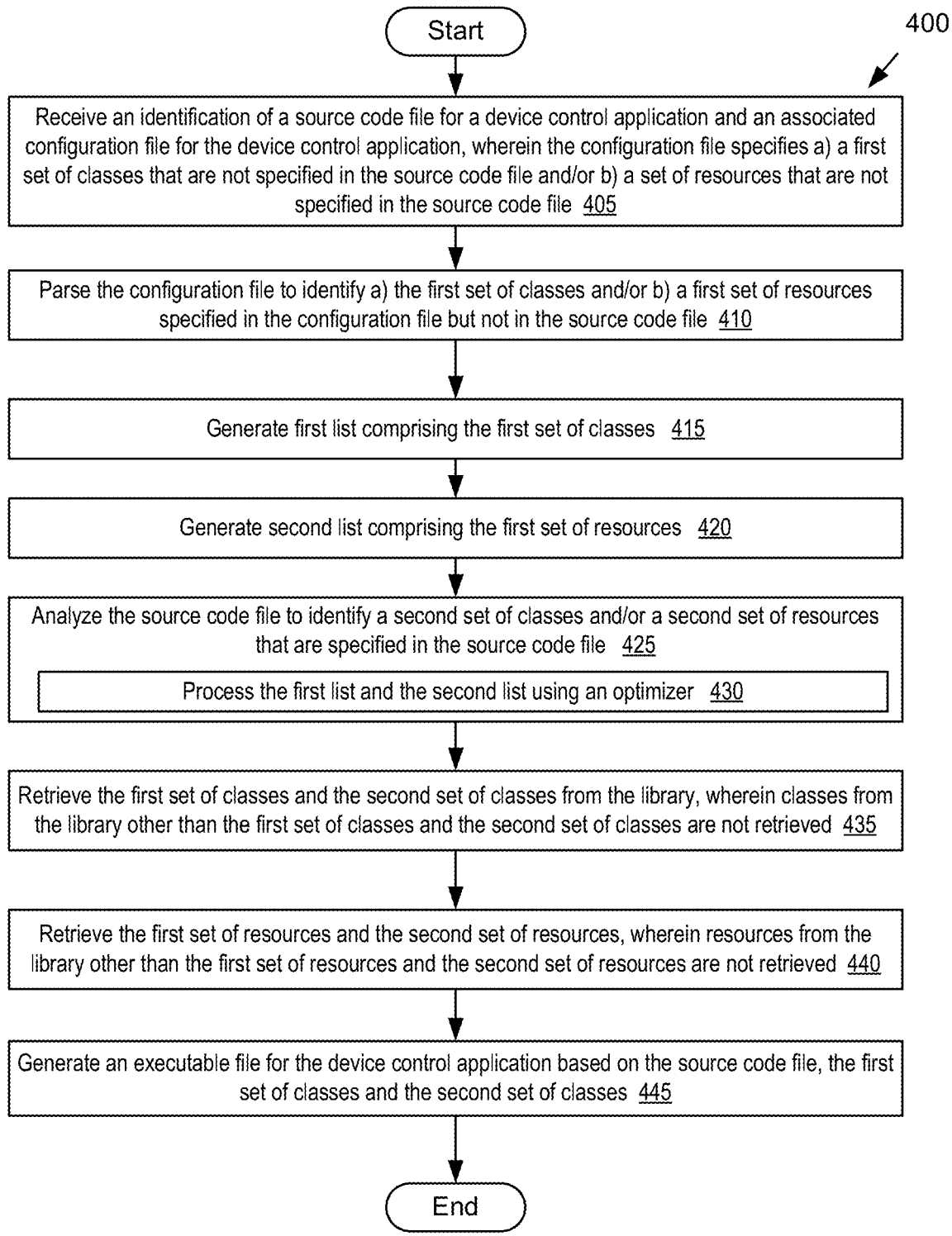
FIG. 4A is a flow diagram illustrating one embodiment for a method of generating a device control application from an application development framework.
Figure 4B:
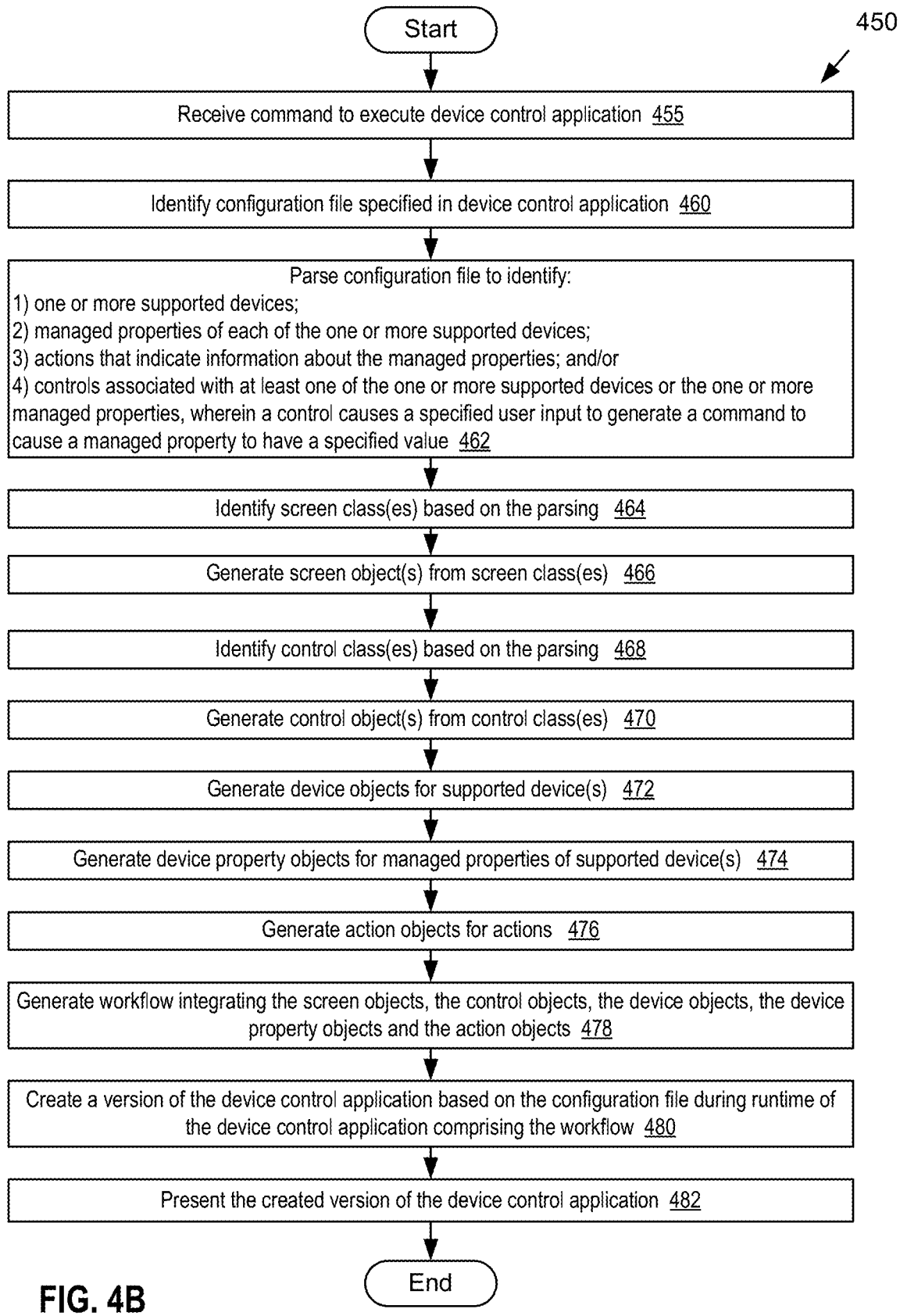
FIG. 4B is a flow diagram illustrating one embodiment for a method of creating a version of a device control application using a configuration file during a runtime of the device control application.

FIG. 4A-B are flow diagrams of various embodiments of methods 400-450 for generating and using device control applications. The methods are performed by processing logic that may include hardware (circuitry, dedicated logic, etc.), software (such as is run on a general purpose computer system or a dedicated machine), firmware, or some combination thereof. Some methods 400-450 may be performed by computing device 132 that includes application development framework 162. Some methods 400-450 may be performed by mobile computing device 105 that includes device control application 115.

For simplicity of explanation, the methods are depicted and described as a series of acts. However, acts in accordance with this disclosure can occur in various orders and/or concurrently, and with other acts not presented and described herein. Furthermore, not all illustrated acts may be performed to implement the methods in accordance with the disclosed subject matter. In addition, those skilled in the art will understand and appreciate that the methods could alternatively be represented as a series of interrelated states via a state diagram or events.

FIG. 4 is a flow diagram illustrating one embodiment for a method 400 of generating a device control application. At block 405 of method 400, processing logic receives an identification of a source code file for a device control application and an associated configuration file for the device control application. The configuration file specifies a first set of classes that are to be used by the device control application but that are not specified in the source code of the device control application. The configuration file may additionally specify a first set of resources that are to be used by the device control application but that are not specified in the source code of the device control application.

At block 410, processing logic parses the configuration file to identify the first set of classes and/or the first set of resources specified in the configuration file (but not in the source code file). At block 415, processing logic generates a first list comprising the first set of classes. At block 420, processing logic generates a second list comprising the first set of resources.

At block 425, processing logic analyses the source code file to identify a second set of classes and/or a second set of resources that are specified in the source code file. The source code may be analyzed by an optimizer (e.g., Proguard) to identify the second set of classes and/or the second set of resources. The optimizer may process the first and second list to determine that the classes and/or resources in the first and second list are not to be removed during compiling, and may analyze the source code file in view of the first and second list.

At block 435, processing logic retrieves the first set of classes and the second set of classes from a library for inclusion in the device control application. Classes other than the first set of classes and the second set of classes are excluded from the device control application (e.g., are not retrieved from the library for inclusion in the device control application). At block 440, processing logic retrieves the first set of resources and the second set of resources from a library for inclusion in the device control application. Resources other than the first set of resources and the second set of resources are excluded from the device control application (e.g., are not retrieved from the library for inclusion in the device control application).

At block 445, processing logic generates an executable file for the device control application based on the source code file, the first set of classes and the second set of classes. The executable file may also be based on the first and second sets of resources.

FIG. 4B is a flow diagram illustrating one embodiment for a method 450 of creating a version of a device control application using a configuration file during a runtime of the device control application. At block 455 of method 450, processing logic receives a command to execute a device control application. At block 460, processing logic identifies a configuration file specified in the device control application. The device control application may include a method to identify and access the configuration file.

At block 462, processing logic parses the configuration file to identify one or more supported devices, managed properties of each of the one or more supported devices, actions that indicate information about the managed properties, and controls associated with at least one of the one or more supported devices or the one or more managed properties. A control may cause a specified user input to generate a command to cause a managed property to have a specified value. At block 464, the processing logic may also identify, from the parsing, one or more screen classes for screens to use for the device control application.

At block 466, processing logic generate screen objects from the identified screen classes. At block 468, processing logic identifies control classes based on the parsing. At block 470, processing logic generates control objects from the control classes. At block 472, processing logic generates device objects for the supported devices. At block 474, processing logic generates device property objects for managed properties of supported devices. At block 476, processing logic generates action objects for the actions.

At block 478, processing logic generates a workflow integrating the screen objects, the control objects, the device objects, the device property objects and the action objects. At block 480, processing logic creates a version of the device control application based on the configuration file during runtime of the device control application, the version of the device control application comprising the generated objects and the created workflow. At block 482, processing logic presents the created version of the device control application on a mobile device on which the device control application was executed.

The same device control application may later be executed on the mobile device or on a different mobile device, but with a different configuration file. The different configuration file may specify a different flow for the application, different connections between device properties, actions, controls, screens, and so on. On execution of the device control application, it may read the different configuration file, perform the operations of method 400, and output a second version of the device control application that is completely different than the first version of the device control application. Thus, the device control application may completely change, but without having to recompile the device control application.

Figure 37:
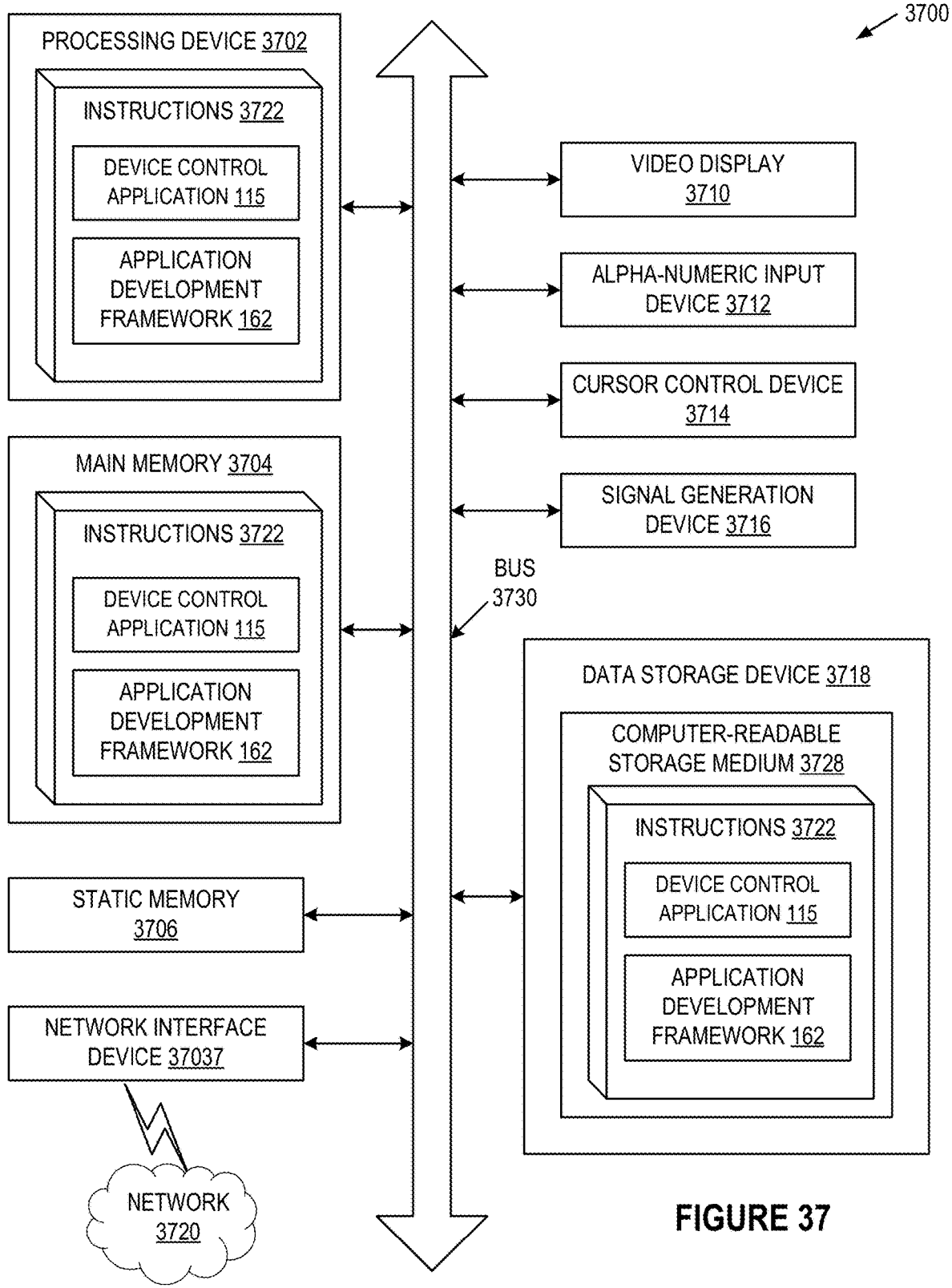
FIG. 37 is a block diagram illustrating an example computing device having installed thereon instructions for a device control application and/or an application development framework for device control applications, in accordance with embodiments of the present disclosure.

FIG. 37 is a block diagram illustrating an example computing device 3700 having installed thereon instructions for an adapter service, in accordance with embodiments of the present disclosure. The computing device 3700 is a machine within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein. In embodiment, computing device 3700 corresponds to computing devices 132 and/or mobile computing devices 105 of FIG. 1.

The example computing device 3700 includes a processing device 3702, a main memory 3704 (e.g., read-only memory (ROM), flash memory, dynamic random access memory (DRAM) such as synchronous DRAM (SDRAM) or Rambus DRAM (RDRAM), etc.), a static memory 3706 (e.g., flash memory, static random access memory (SRAM), etc.), and a secondary memory (e.g., a data storage device 3718), which communicate with each other via a bus 3730.

Processing device 3702 represents one or more general-purpose processors such as a microprocessor, central processing unit, or the like. More particularly, the processing device 3702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 3702 may also be one or more special-purpose processing devices such as an application specific integrated circuit (ASIC), a field programmable gate array (FPGA), a digital signal processor (DSP), network processor, or the like. Processing device 3702 is configured to execute the processing logic (instructions 3722) for performing the operations discussed herein. The instructions 3722 may include instructions for device control application 115 and/or for application development framework 162.

The computing device 3700 may further include a network interface device 3708. The computing device 3700 also may include a video display unit 3710 (e.g., a liquid crystal display (LCD) or a cathode ray tube (CRT)), an alphanumeric input device 3712 (e.g., a keyboard), a cursor control device 3714 (e.g., a mouse), and a signal generation device 3716 (e.g., a speaker).

The data storage device 3718 may include a machine-readable storage medium (or more specifically a computer-readable storage medium) 3728 on which is stored one or more sets of instructions 3722 embodying any one or more of the methodologies or functions described herein, such as instructions for adapter service 131. The instructions 3722 may also reside, completely or at least partially, within the main memory 3704 and/or within the processing device 3702 during execution thereof by the computer system 3700, the main memory 3704 and the processing device 3702 also constituting computer-readable storage media.

The computer-readable storage medium 3728 may also be used to store an adapter service 131 as discussed herein above, and/or a software library containing methods that call such an adapter service 131. While the computer-readable storage medium 3728 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine and that cause the machine to perform any one or more of the methodologies described herein. The term "computer-readable storage medium" shall accordingly be taken to include, but not be limited to, the non-transitory media including solid-state memories, and optical and magnetic media.

The modules, components and other features described herein can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "parsing", "analyzing", "retrieving", "generating", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the discussed purposes, or it may comprise a general purpose computer system selectively programmed by a computer program stored in the computer system. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, or other type of machine-accessible storage media.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
receiving an identification of a source code file for a device control application and an associated configuration file for the device control application, wherein the configuration file specifies a first set of classes from a library, wherein the configuration file does not include the source code file, wherein the first set of classes comprises one or more screen classes for generating screen objects that represent navigation destinations for the device control application and one or more control classes for generating control objects that control at least one of a device or a device property of the device, wherein the device control application is a mobile application configured to reside on a mobile computing device that is separate from the device, and wherein the device control application operates as a remote control for viewing and controlling the device;
parsing, by a processing device, the configuration file to identify the first set of classes that are specified in the configuration file but that are not specified in the source code file;
analyzing the source code file to identify a second set of classes that are specified in the source code file;
retrieving the first set of classes and the second set of classes from the library, wherein classes from the library other than the first set of classes and the second set of classes are not retrieved; and
generating, by the processing device, an executable file for the device control application based on the source code file, the first set of classes and the second set of classes.

2. The method of claim 1, further comprising:
parsing the configuration file to identify a set of resources that are specified in the configuration file but that are not specified in the source code file, wherein the set of resources comprise graphics for the device control application; and
retrieving the set of resources from the library, wherein resources from the library other than the set of resources are not retrieved, and wherein the executable file for the device control application comprises the set of resources.

3. The method of claim 2, further comprising:
generating a first list comprising the first set of classes;
generating a second list comprising the set of resources; and
processing the first list and the second list using an optimizer, wherein the first list and the second list cause the optimizer to retrieve the first set of classes and the set of resources.

4. The method of claim 1, wherein the device that is controllable using the device control application is a network-connected device comprising an embedded system.

5. The method of claim 1, further comprising performing the following operations during runtime of the executable file for the device control application:
- parsing the configuration file;
- generating one or more screen objects from the one or more screen classes in the first set of classes;
- generating one or more control objects from the one or more control classes in the first set of classes;
- identifying a set of supported devices based on the parsing;
- generating a set of device objects for the set of supported devices;
- identifying a set of device properties for each device in the set of supported devices based on the parsing;
- generating a set of device property objects for the sets of device properties;
- identifying a set of actions associated with the set of device properties for each device in the set of supported devices based on the parsing;
- generating a set of action objects for the set of actions; and
- generating a workflow integrating the one or more screen objects, the one or more control objects, the set of device objects, the set of device property objects and the set of action objects.

6. The method of claim 5, wherein the workflow comprises a linked set of at least two screen objects of the one or more screen objects and navigation features for navigating between the at least two screen objects, wherein a screen object of the at least two screen objects comprises a subset of the one or more control objects linked to a device object of the set of device objects and to one or more device property objects of the set of device property objects.

7. The method of claim 5, wherein the workflow comprises:
- an all devices screen object comprising a list of devices associated with a user account, wherein each device from the list of devices is selected from the set of supported devices; and
- a device details screen object linked to the all devices screen object, the device details screen object comprising a link to a device object for a particular device of the set of supported devices and a link to one or more control objects for controlling the particular device, wherein each of the one or more control objects is associated with a particular value of a particular device property of the particular device.

8. A non-transitory computer readable storage medium comprising instructions that, when executed by a processing device, cause the processing device to perform operations comprising:
- receiving an identification of a source code file for a device control application and an associated configuration file for the device control application, wherein the configuration file specifies a first set of classes from a library, wherein the configuration file does not include the source code file, wherein the first set of classes comprises one or more screen classes for generating screen objects that represent navigation destinations for the device control application and one or more control classes for generating control objects that control at least one of a device or a device property of the device, wherein the device control application is a mobile application configured to reside on a mobile computing device that is separate from the device, and wherein the device control application operates as a remote control for viewing and controlling the device;
- parsing, by the processing device, the configuration file to identify the first set of classes that are specified in the configuration file but that are not specified in the source code file;
- analyzing the source code file to identify a second set of classes that are specified in the source code file;
- retrieving the first set of classes and the second set of classes from the library, wherein classes from the library other than the first set of classes and the second set of classes are not retrieved; and
- generating, by the processing device, an executable file for the device control application based on the source code file, the first set of classes and the second set of classes.

9. The non-transitory computer readable storage medium of claim 8, the operations further comprising:
- parsing the configuration file to identify a set of resources that are specified in the configuration file but that are not specified in the source code file, wherein the set of resources comprise graphics for the device control application; and
- retrieving the set of resources from the library, wherein resources from the library other than the set of resources are not retrieved, and wherein the executable file for the device control application comprises the set of resources.

10. The non-transitory computer readable storage medium of claim 9, the operations further comprising:
- generating a first list comprising the first set of classes;
- generating a second list comprising the set of resources; and
- processing the first list and the second list using an optimizer, wherein the first list and the second list cause the optimizer to retrieve the first set of classes and the set of resources.

11. The non-transitory computer readable storage medium of claim 8, wherein the device that is controllable using the device control application is a network-connected device comprising an embedded system.

12. The non-transitory computer readable storage medium of claim 8, the operations further comprising performing the following operations during runtime of the executable file for the device control application:
- parsing the configuration file;
- generating one or more screen objects from the one or more screen classes in the first set of classes;
- generating one or more control objects from the one or more control classes in the first set of classes;
- identifying a set of supported devices based on the parsing;
- generating a set of device objects for the set of supported devices;
- identifying a set of device properties for each device in the set of supported devices based on the parsing;
- generating a set of device property objects for the sets of device properties;
- identifying a set of actions associated with the set of device properties for each device in the set of supported devices based on the parsing;
- generating a set of action objects for the set of actions; and
- generating a workflow integrating the one or more screen objects, the one or more control objects, the set of device objects, the set of device property objects and the set of action objects.

13. The non-transitory computer readable storage medium of claim 12, wherein the workflow comprises a linked set of at least two screen objects of the one or more screen objects and navigation features for navigating between the at least two screen objects, wherein a screen object of the at least two screen objects comprises a subset of the one or more control objects linked to a device object of the set of device objects and to one or more device property objects of the set of device property objects.

14. The non-transitory computer readable storage medium of claim 12, wherein the workflow comprises:
   an all devices screen object comprising a list of devices associated with a user account, wherein each device from the list of devices is selected from the set of supported devices; and
   a device details screen object linked to the all devices screen object, the device details screen object comprising a link to a device object for a particular device of the set of supported devices and a link to one or more control objects for controlling the particular device, wherein each of the one or more control objects is associated with a particular value of a particular device property of the particular device.

15. A system comprising:
   a memory; and
   a processing device operatively coupled to the memory, the processing device to:
      receive an identification of a source code file for a device control application and an associated configuration file for the device control application, wherein the configuration file specifies a first set of classes from a library, wherein the configuration file does not include the source code file, wherein the first set of classes comprises one or more screen classes for generating screen objects that represent navigation destinations for the device control application and one or more control classes for generating control objects that control at least one of a device or a device property of the device, wherein the device control application is a mobile application configured to reside on a mobile computing device that is separate from the device, and wherein the device control application operates as a remote control for viewing and controlling the device;
      parse the configuration file to identify the first set of classes that are specified in the configuration file but that are not specified in the source code file;
      analyze the source code file to identify a second set of classes that are specified in the source code file;
      retrieve the first set of classes and the second set of classes from the library, wherein classes from the library other than the first set of classes and the second set of classes are not retrieved; and
      generate an executable file for the device control application based on the source code file, the first set of classes and the second set of classes.

16. The system of claim 15, wherein the processing device is further to:
   parse the configuration file to identify a set of resources that are specified in the configuration file but that are not specified in the source code file, wherein the set of resources comprise graphics for the device control application; and
   retrieve the set of resources from the library, wherein resources from the library other than the set of resources are not retrieved, and wherein the executable file for the device control application comprises the set of resources.

17. The system of claim 16, wherein the processing device is further to:
   generating a first list comprising the first set of classes;
   generating a second list comprising the set of resources; and
   processing the first list and the second list using an optimizer, wherein the first list and the second list cause the optimizer to retrieve the first set of classes and the set of resources.

18. The system of claim 15, wherein the device that is controllable using the device control application is a network-connected device comprising an embedded system.

19. The system of claim 15, wherein the processing device or an additional processing device is to perform the following operations during runtime of the executable file for the device control application:
   parse the configuration file;
   generate one or more screen objects from the one or more screen classes in the first set of classes;
   generate one or more control objects from the one or more control classes in the first set of classes;
   identify a set of supported devices based on the parsing;
   generate a set of device objects for the set of supported devices;
   identify a set of device properties for each device in the set of supported devices based on the parsing;
   generate a set of device property objects for the sets of device properties;
   identify a set of actions associated with the set of device properties for each device in the set of supported devices based on the parsing;
   generate a set of action objects for the set of actions; and
   generate a workflow integrating the one or more screen objects, the one or more control objects, the set of device objects, the set of device property objects and the set of action objects.

20. The system of claim 19, wherein the workflow comprises a linked set of at least two screen objects of the one or more screen objects and navigation features for navigating between the at least two screen objects, wherein a screen object of the at least two screen objects comprises a subset of the one or more control objects linked to a device object of the set of device objects and to one or more device property objects of the set of device property objects.

* * * * *